United States Patent
Shin et al.

(10) Patent No.: US 11,064,497 B2
(45) Date of Patent: Jul. 13, 2021

(54) METHOD FOR TRANSMITTING OR RECEIVING DATA IN WIRELESS COMMUNICATION SYSTEM SUPPORTING NARROWBAND INTERNET OF THINGS, AND DEVICE THEREFOR

(71) Applicant: LG ELECTRONICS INC., Seoul (KR)

(72) Inventors: Seokmin Shin, Seoul (KR); Jaehyung Kim, Seoul (KR); Joonkui Ahn, Seoul (KR); Seunggye Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/494,127

(22) PCT Filed: Mar. 15, 2018

(86) PCT No.: PCT/KR2018/003045
§ 371 (c)(1),
(2) Date: Sep. 13, 2019

(87) PCT Pub. No.: WO2018/169326
PCT Pub. Date: Sep. 20, 2018

(65) Prior Publication Data
US 2020/0045706 A1 Feb. 6, 2020

Related U.S. Application Data

(60) Provisional application No. 62/546,497, filed on Aug. 16, 2017, provisional application No. 62/481,630, (Continued)

(51) Int. Cl.
*H04W 72/04* (2009.01)
*H04W 4/70* (2018.01)
(Continued)

(52) U.S. Cl.
CPC ....... *H04W 72/0493* (2013.01); *H04L 1/1812* (2013.01); *H04W 4/70* (2018.02);
(Continued)

(58) Field of Classification Search
CPC ........... H04W 72/042; H04W 72/0446; H04W 88/02
See application file for complete search history.

(56) References Cited

U.S. PATENT DOCUMENTS 10,506,574 B2 * 12/2019 Zhang ................... H04B 7/024
2013/0286905 A1   10/2013 Yang et al.
(Continued)

FOREIGN PATENT DOCUMENTS

KR         20130141600         12/2013

OTHER PUBLICATIONS

3rd Generation Partnership Project; Technical Specification Group Radio Access Network; "Evolved Universal Terrestrial Radio Access (E-UTRA); Medium Access Control (MAC) protocol specification (Release 13)," 3GPP TS 36.321 V13.3.0, Sep. 2016, 94 pages.

*Primary Examiner* — Chandrahas B Patel
(74) *Attorney, Agent, or Firm* — Fish & Richardson P.C.

(57) ABSTRACT

Disclosed are a method for transmitting/receiving data in a wireless communication system supporting NarrowBand-Internet of Things (NB-IoT) and a device therefor. Specifically, a method for receiving data by a terminal may include: receiving, from a base station, Semi-Persistent Scheduling (SPS) configuration information for SPS; receiving, from the base station, an SPS control channel for delivering control information representing activation of the SPS; and receiving, from the base station, SPS data channels in specific subframes scheduled according to the SPS configuration information, in which search spaces related to the remaining SPS data channels other than a first SPS data
(Continued)

channel among the received SPS data channels may be configured not to be monitored by the UE.

20 Claims, 12 Drawing Sheets

Related U.S. Application Data filed on Apr. 4, 2017, provisional application No. 62/471,883, filed on Mar. 15, 2017.

(51) Int. Cl.
*H04W 4/80* (2018.01)
*H04L 1/18* (2006.01)

(52) U.S. Cl.
CPC ........... *H04W 4/80* (2018.02); *H04W 72/042* (2013.01); *H04W 72/0446* (2013.01)

(56) References Cited

U.S. PATENT DOCUMENTS

2015/0282126 A1 10/2015 Park et al.
2016/0323865 A1 11/2016 Kwon et al.

\* cited by examiner

METHOD FOR TRANSMITTING OR RECEIVING DATA IN WIRELESS COMMUNICATION SYSTEM SUPPORTING NARROWBAND INTERNET OF THINGS, AND DEVICE THEREFOR

CROSS-REFERENCE TO RELATED APPLICATIONS

This application is a National Stage application under 35 U.S.C. § 371 of International Application No. PCT/KR2018/003045, filed on Mar. 15, 2018, which claims the benefit of U.S. Provisional Application No. 62/546,497, filed on Aug. 16, 2017, U.S. Provisional Application No. 62/481,630, filed on Apr. 4, 2017, and U.S. Provisional Application No. 62/471,883, filed on Mar. 15, 2017. The disclosures of the prior applications are incorporated by reference in their entirety.

TECHNICAL FIELD

The present disclosure relates to a method for transmitting/receiving data in a wireless communication system supporting a narrowband Internet-of-Things (NB-IoT), and more particularly, to a method for transmitting/receiving data through semi-persistent scheduling (SPS) and a device supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

This specification proposes a method for transmitting/receiving data through semi-persistent scheduling (SPS) in a wireless communication system supporting NarrowBand-Internet of Things (NB-IoT).

This specification proposes an SPS operating method for an NB-IoT supporting a single Hybrid automatic repeat request (HARQ).

This specification proposes an SPS operating method for an NB-IoT supporting multiple HARQs.

To this end, this specification proposes a configuration method for monitoring of a search space of a terminal, an SPS retransmission method, and a method for delivering SPS configuration information in relation to the SPS operation.

The technical objects of the present disclosure are not limited to the aforementioned technical objects, and other technical objects, which are not mentioned above, will be apparently appreciated by a person having ordinary skill in the art from the following description.

Technical Solution

In an aspect of the present disclosure, a method for transmitting/receiving, by a terminal, data in a wireless communication system supporting NarrowBand-Internet of Things (NB-IoT) includes: receiving, from a base station, SPS configuration information for Semi-Persistent Scheduling (SPS); receiving, from the base station, an SPS control channel for delivering control information indicating activation of the SPS; and receiving, from the base station, SPS data channels in specific subframes scheduled according to the SPS configuration information, in which search spaces related to the remaining SPS data channels other than a first SPS data channel among the received SPS data channels are configured not to be monitored by the UE.

Further, according to an aspect of the present disclosure, in the method, the search space may be located within a specific period configured based on at least one of a start subframe, SPS interval information, or a PDCCH period of each SPS data channel.

Further, according to an aspect of the present disclosure, in the method, the search space may correspond to a search space located within a PDCCH period to which each SPS channel belongs.

Further, according to an aspect of the present disclosure, in the method, the search space may be configured to be user equipment-specific.

Further, according to an aspect of the present disclosure, in the method, the control information indicating the activation of the SPS may include an SPS indication field configured by 1 bit indicating the activation or deactivation of the SPS.

Further, according to an aspect of the present disclosure, in the method, the UE may support a single Hybrid Automatic Repeat and request (HARQ) process.

Further, according to an aspect of the present disclosure, the method may further include: receiving, from the base station, a specific control channel for delivering control information indicating retransmission of the SPS; and receiving a specific data channel scheduled by the specific control channel, in which a resource region allocated to the specific control channel and a resource region allocated to the specific data channel may not overlap with the search space.

Further, according to an aspect of the present disclosure, in the method, a size of the control information indicating the retransmission of the SPS may be configured to be smaller than the size of the control information indicating the activation of the SPS.

Further, according to an aspect of the present disclosure, in the method, a value of a New Data Indication (NDI) field included in the control information indicating the retransmission of the SPS may be configured opposite to the value of the NDI field included in the control information indicating the activation of the SPS.

Further, according to an aspect of the present disclosure, the method may further include: receiving, from the base station, a specific signal indicating whether to monitor the search space, in which the specific signal may be transmitted when the SPS is activated.

In another aspect of the present disclosure, a terminal receiving data in a wireless communication system supporting NarrowBand-Internet of Things (NB-IoT) may include: a Radio Frequency (RF) unit for transmitting and receiving a radio signal; and a processor functionally connected to the RF unit, in which the processor may be configured to receive, from a base station, SPS configuration information for Semi-Persistent Scheduling (SPS), receive, from the base station, an SPS control channel for delivering control information indicating activation of the SPS, and receive, from the base station, SPS data channels in specific subframes scheduled according to the SPS configuration information, and search spaces related to the remaining SPS data channels other than a first SPS data channel among the received SPS data channels may be configured not to be monitored by the UE.

Advantageous Effects

According to an embodiment of the present disclosure, since a terminal is configured not to perform monitoring for an unnecessary search space, there is an effect of reducing power consumption of the terminal.

Further, according to an embodiment of the present disclosure, even though semi-persistent scheduling (SPS) is introduced in an NB-IoT system, there is an advantage in that complexity of the terminal can be maintained like the existing NB-IoT system.

Advantages which can be obtained in the present disclosure are not limited to the aforementioned effects and other unmentioned advantages will be clearly understood by those skilled in the art from the following description.

DESCRIPTION OF DRAWINGS

The accompanying drawings, which are included herein as a part of the description for help understanding the present disclosure, provide embodiments of the present disclosure, and describe the technical features of the present disclosure with the description below.

MODE FOR INVENTION

Figure 1:
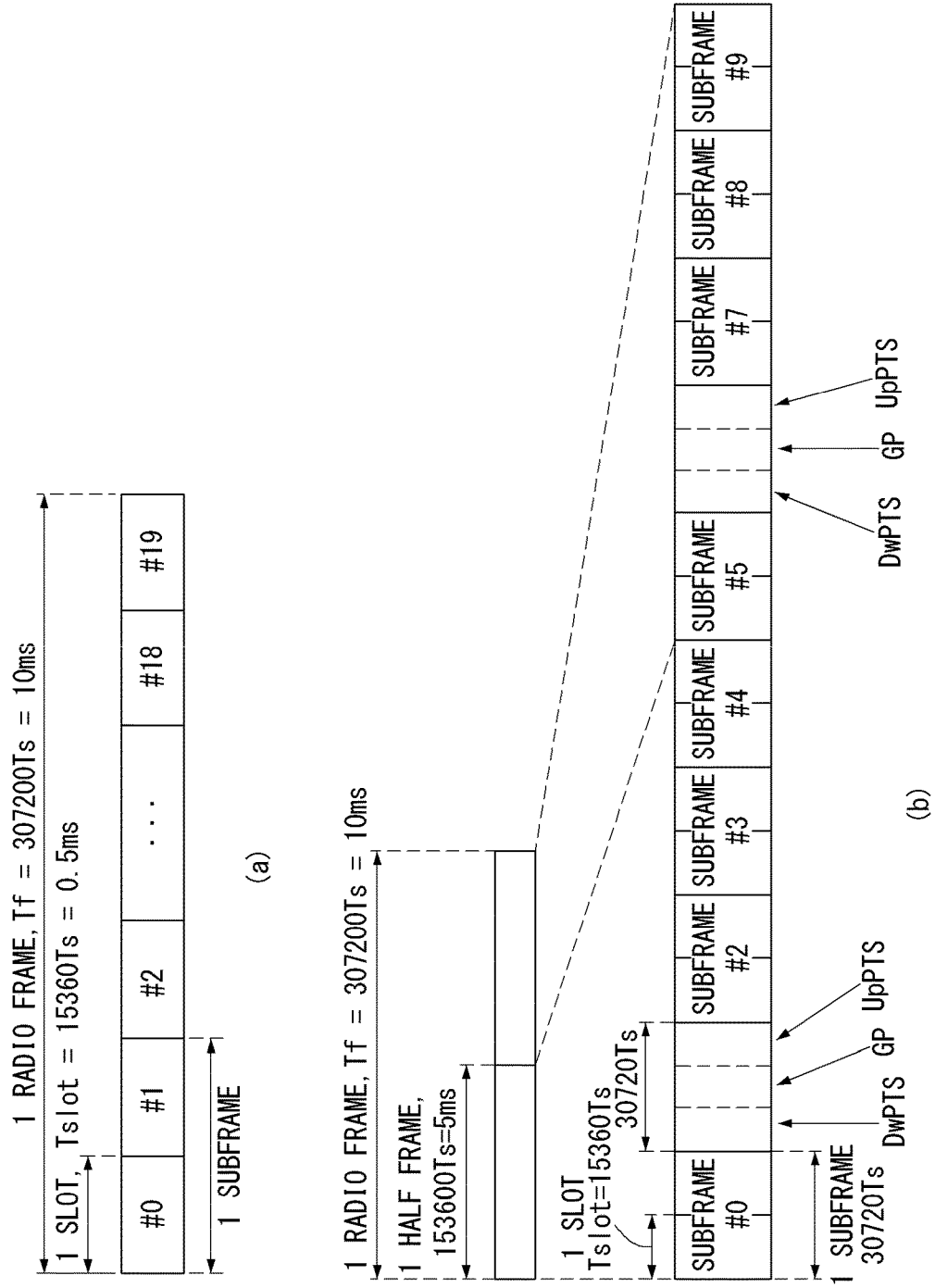
FIG. 1 illustrates the structure of a radio frame in a wireless communication system to which the present disclosure may be applied.

Some embodiments of the present disclosure are described in detail with reference to the accompanying drawings. A detailed description to be disclosed along with the accompanying drawings are intended to describe some embodiments of the present disclosure and are not intended to describe a sole embodiment of the present disclosure. The following detailed description includes more details in order to provide full understanding of the present disclosure. However, those skilled in the art will understand that the present disclosure may be implemented without such more details.

In some cases, in order to avoid that the concept of the present disclosure becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present disclosure, and the use of such specific terms may be changed in various forms without departing from the technical sprit of the present disclosure.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

General System

FIG. 1 shows the structure of a radio frame in a wireless communication system to which an embodiment of the present disclosure may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

FIG. 1(a) exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot $2i$ and slot $2i+1$. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) shows frame structure type 2. A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

Referring to Table 1, in each subframe of the radio frame, CD' represents a subframe for a DL transmission, 'U' represents a subframe for UL transmission, and 'S' represents a special subframe including three types of fields including a Downlink Pilot Time Slot (DwPTS), a Guard Period (GP), and an Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot $2i$ and slot $2i+1$ of $T\_slot=15360*T\_s=0.5$ ms.

The UL-DL configuration may be classified into 7 types, and the position and/or the number of a DL subframe, a special subframe and a UL subframe are different for each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio subframe according to the example of FIG. 1 is just an example, and the number of subcarriers included in a radio frame, the number of slots included in a subframe and the number of OFDM symbols included in a slot may be changed in various manners.

Figure 2:
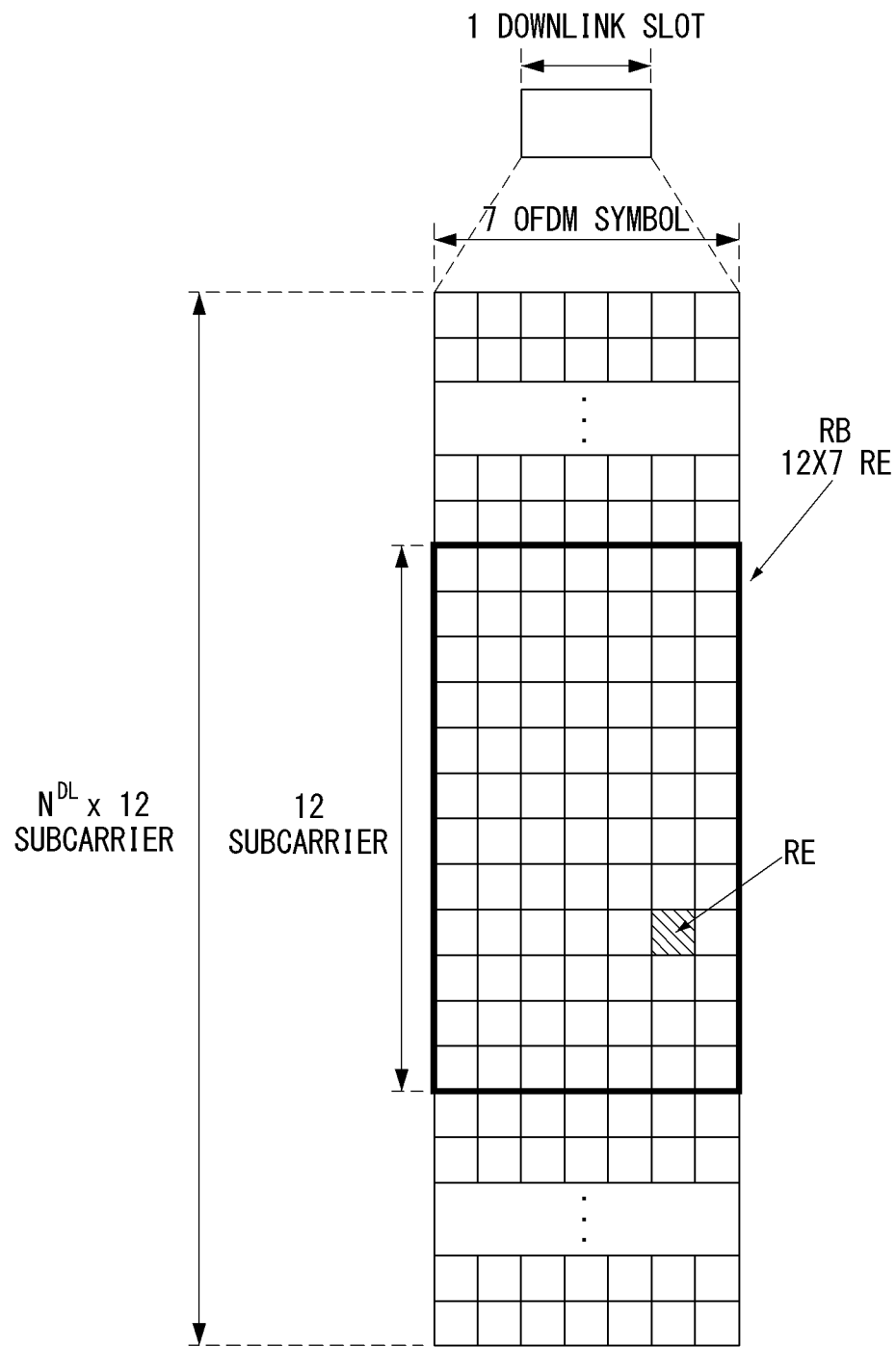
FIG. 2 is a diagram illustrating a resource grid for a downlink slot in a wireless communication system to which the present disclosure may be applied.

FIG. 2 is a diagram illustrating a resource grid for one downlink slot in a wireless communication system to which an embodiment of the present disclosure may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present disclosure is not limited thereto.

Each element on the resource grid is referred to as a resource element, and one resource block (RB) includes 12×7 resource elements. The number of RBs N^DL included in a downlink slot depends on a downlink transmission bandwidth.

The structure of an uplink slot may be the same as that of a downlink slot.

Figure 3:
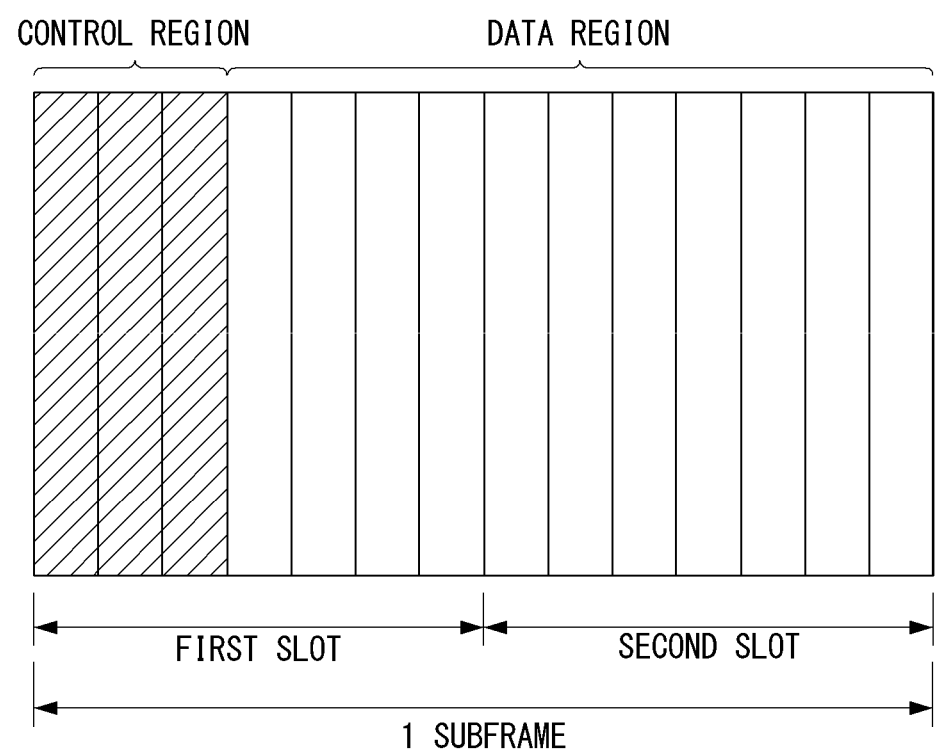
FIG. 3 illustrates a structure of downlink subframe in a wireless communication system to which the present disclosure may be applied.

FIG. 3 shows the structure of a downlink subframe in a wireless communication system to which an embodiment of the present disclosure may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ).

Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to a UE and attaches a Cyclic Redundancy Check (CRC) to the control information. A unique identifier (which is called a Radio Network Temporary Identifier (RNTI)) is masked to the CRC depending on the owner or use of a PDCCH. If the PDCCH is intended for a specific UE, an identifier unique to the UE, for example, a Cell-RNTI (C-RNTI) may be masked to the CRC. If the PDCCH is intended for a paging message, a paging indication identifier, for example, a Paging-RNTI (P-RNTI) may be masked to the CRC. If the PDCCH is intended for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by a UE.

An EPDCCH (Enhanced PDCCH) carries UE-specific signaling. An EPDCCH is disposed at a Physical Resource Block (PRB) determined in a UE-specific manner. In other words, as described above, a PDCCH may be transmitted from up to three OFDM symbols in a first slot of a subframe, but an EPDCCH may be transmitted f a non-PDCCH resource region. The starting point (i.e., symbol) at which an EPDCCH is started in a subframe may be configured to a UE through higher layer signaling (for example, RRC signaling).

An EPDCCH may carry a transmission format related to the DL-SCH; resource allocation and HARQ information; transmission format related to the UL-SCH; resource allocation information related to the Sidelink Shared Channel (SL-SCH) and Physical Sidelink Control Channel (PSCCH). Multiple EPDCCHs may be supported, and a UE may monitor a set of EPCCHs.

An EPDCCH may be transmitted by using one or more consecutive Enhanced CCEs (ECCEs), and for each EPDCCH format, the number of ECCEs for each EPDCCH may be determined.

Each ECCE may comprise a plurality of Enhanced Resource Element Groups (EREGs). An EREG is used for defining mapping ECCEs to REs. For each PRB pair, 16 EREGs may be defined. In each PRB pair, except for those REs carrying a DMRS, all of the REs are numbered ranging from 0 to 15 in the increasing order of frequency and then in the increasing order of time.

The UE may monitor a plurality of EPDCCHs. For example, one or two EPDCCH sets may be configured within one PRB pair for which the UE monitors EPDCCH transmission.

As a different number of ECCEs are merged together, different coding rates may be implemented for an EPCCH. An EPCCH may employ localized transmission or distributed transmission, according to which mapping of the ECCE to an RE within a PRB may be varied.

Figure 4:
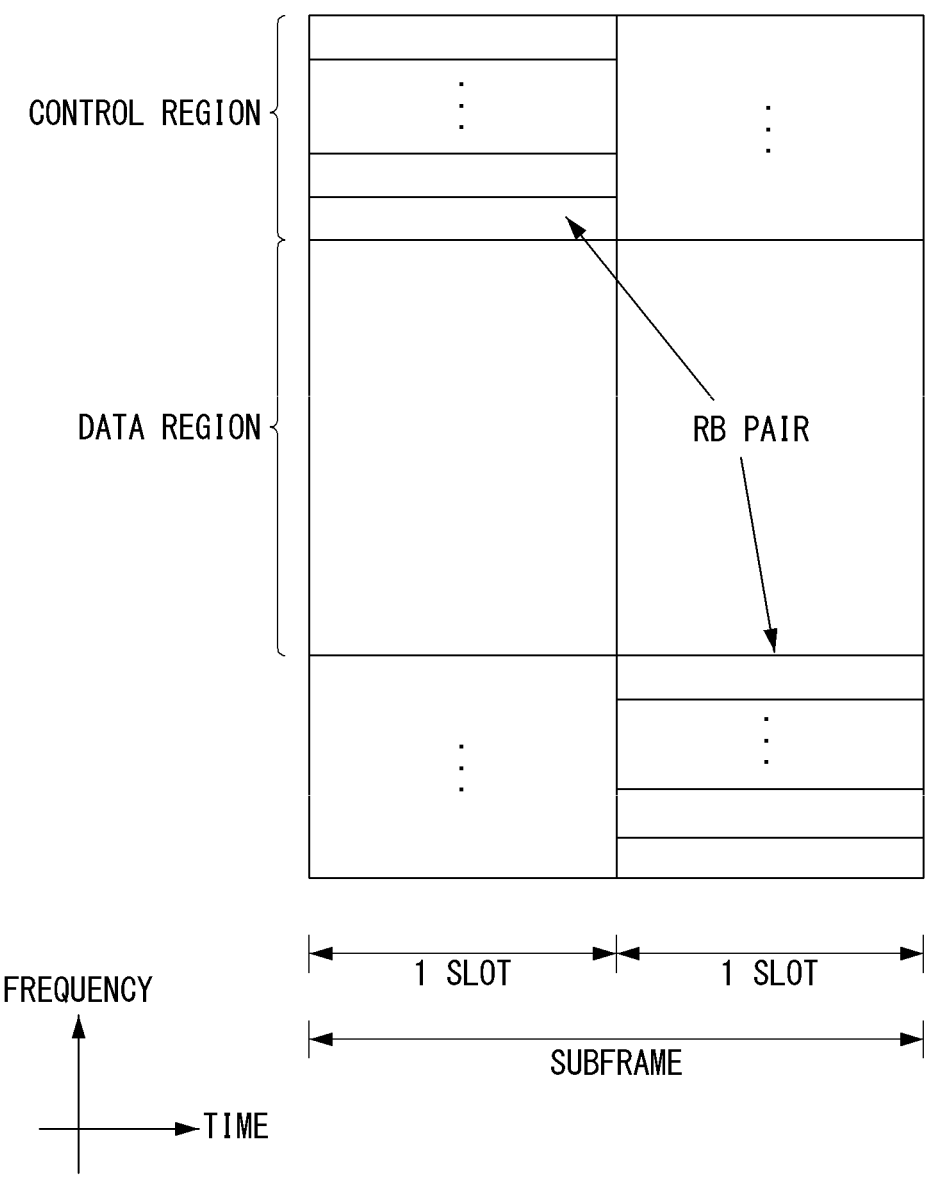
FIG. 4 illustrates a structure of uplink subframe in a wireless communication system to which the present disclosure may be applied.

FIG. 4 shows the structure of an uplink subframe in a wireless communication system to which an embodiment of the present disclosure may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Carrier Aggregation in General

Communication environments considered in the embodiments of the present disclosure includes all of multi-carrier supporting environments. In other words, a multi-carrier system or a carrier aggregation system according to the present disclosure refers to the system utilizing aggregation of one or more component carriers having bandwidth narrower than target bandwidth to establish a broadband communication environment.

A multi-carrier according to the present disclosure refers to aggregation of carriers, and the carrier aggregation in this sense refers to not only the aggregation of contiguous carriers but also the aggregation of non-contiguous carriers. Also, the numbers of component carriers aggregated for downlink and uplink transmission can be configured differently from each other. The case where the number of downlink component carriers (hereinafter, it is called 'DL CC') is the same as the number of uplink component carriers (hereinafter, it is called 'UL CC') is called symmetric aggregation, whereas it is called asymmetric aggregation otherwise. The term of carrier aggregation may be used interchangeably with bandwidth aggregation and spectrum aggregation.

Carrier aggregation composed of a combination of two or more component carriers is intended to support bandwidth of up to 100 MHz for the case of the LTE-A system. When one or more carriers having narrower bandwidth than target bandwidth are combined, the bandwidth of the carrier to be combined may be limited to the bandwidth defined by an existing system to maintain compatibility with the existing IMT system. For example, while the existing system supports bandwidth of 1.4, 3, 5, 10, 15, and 20 MHz, the 3GPP LTE-A system may support bandwidth larger than 20 MHz by using a combination of the predefined bandwidth to maintain compatibility with the existing system. Also, a carrier aggregation system according to the present disclosure may support carrier aggregation by defining new bandwidth independently of the bandwidth used in the existing system.

The LTE-A system introduces a concept of a cell for management of radio resources.

The carrier aggregation environment may be referred to as a multiple cell environment. A cell is defined as a combination of a pair of a DL CC and an UL CC, but the UL CC is not an essential element. Therefore, a cell may be composed of downlink resources only or a combination of downlink and uplink resources. In case a particular UE is linked to only one configured serving cell, one DL CC and one UL CC are employed. However, if the particular UE is linked to two or more configured serving cells, as many DL CCs as the number of cells are employed while the number of UL CCs may be equal to or smaller than the number of DL CCs.

Meanwhile, the DL CCs and the UL CCs may be composed in the opposite way. In other words, in case a particular UE is linked to a plurality of configured serving cells, a carrier aggregation environment which has more UL CCs than DL CCs may also be supported. In other words, carrier aggregation may be understood as a combination of two or more cells having different carrier frequencies (center frequencies of the cells). At this time, the term of 'cell' should be distinguished from the 'cell' usually defined as a region covered by an eNB.

The LTE-A system defines a primary cell (PCell) and a secondary cell (SCell). A PCell and an SCell may be used as a serving cell. A UE being in an RRC_CONNECTED state but not being configured for carrier aggregation or not supporting carrier aggregation may be linked to one or more serving cells, and the entire serving cells include a PCell and one or more SCells.

A serving cell (PCell and SCell) may be configured through an RRC parameter. PhysCellId is a physical layer identifier of a cell, having an integer value ranging from 0 to 503. SCellIndex is a short identifier used for identifying an SCell, having an integer value ranging from 1 to 7. ServCellIndex is a short identifier used for identifying a serving cell (PCell or SCell), having an integer value ranging from 0 to 7. The value of 0 is applied to a PCell, and SCellIndex is pre-assigned to be applied to an SCell. In other words, the cell which has the smallest cell ID (or cell index) of ServCellIndex becomes the PCell.

A PCell refers to a cell operating on a primary frequency (or a primary CC). A PCell may be used for an UE to perform an initial connection establishment process or a connection re-establishment process; a PCell may refer to the cell indicated during a handover process. Also, a PCell refers to the cell which plays a central role for control-related communication among configured serving cells in a carrier aggregation environment. In other words, a UE is capable of receiving and transmitting a PUCCH only through its own PCell; also, the UE may obtain system information or modify a monitoring procedure only through the PCell. The Evolved Universal Terrestrial Radio Access Network (E-UTRAN) may change only the PCell by using an RRC connection reconfiguration message (RRCConnectionReconfiguration) of a higher layer including mobility control information (mobilityControlInfo) so that the UE supporting carrier aggregation environments may carry out a handout procedure.

An SCell refers to a cell operating on a secondary frequency (or a secondary CC). For a particular UE, only one PCell is allocated, but one or more SCells may be allocated. An SCell may be composed after configuration for an RRC connection is completed and may be used to provide additional radio resources. A PUCCH does not exist in the remaining cells except for PCells among the serving cells configured for a carrier aggregation environment, i.e., SCells. When adding an SCell to a UE supporting a carrier aggregation environment, the E-UTRAN may provide all of the system information related to the operation of a cell in the RRC_CONNECTED state through a dedicated signal. Modification of system information may be controlled according to release and addition of a related SCell, and at this time, an RRC connection reconfiguration (RRCConnectionReconfiguration) message of a higher layer may be used. The E-UTRAN, instead of broadcasting a signal within an SCell, may carry out dedicated signaling using parameters different for each UE.

After the initial security activation process is started, the E-UTRAN may form a network including one or more SCells in addition to a PCell defined in the initial step of a connection establishment process. In a carrier aggregation environment, a PCell and an SCell may operate as an independent component carrier. In the embodiment below, a primary component carrier (PCC) may be used in the same context as the PCell, while a secondary component carrier (SCC) may be used in the same context as the SCell.

Figure 5:
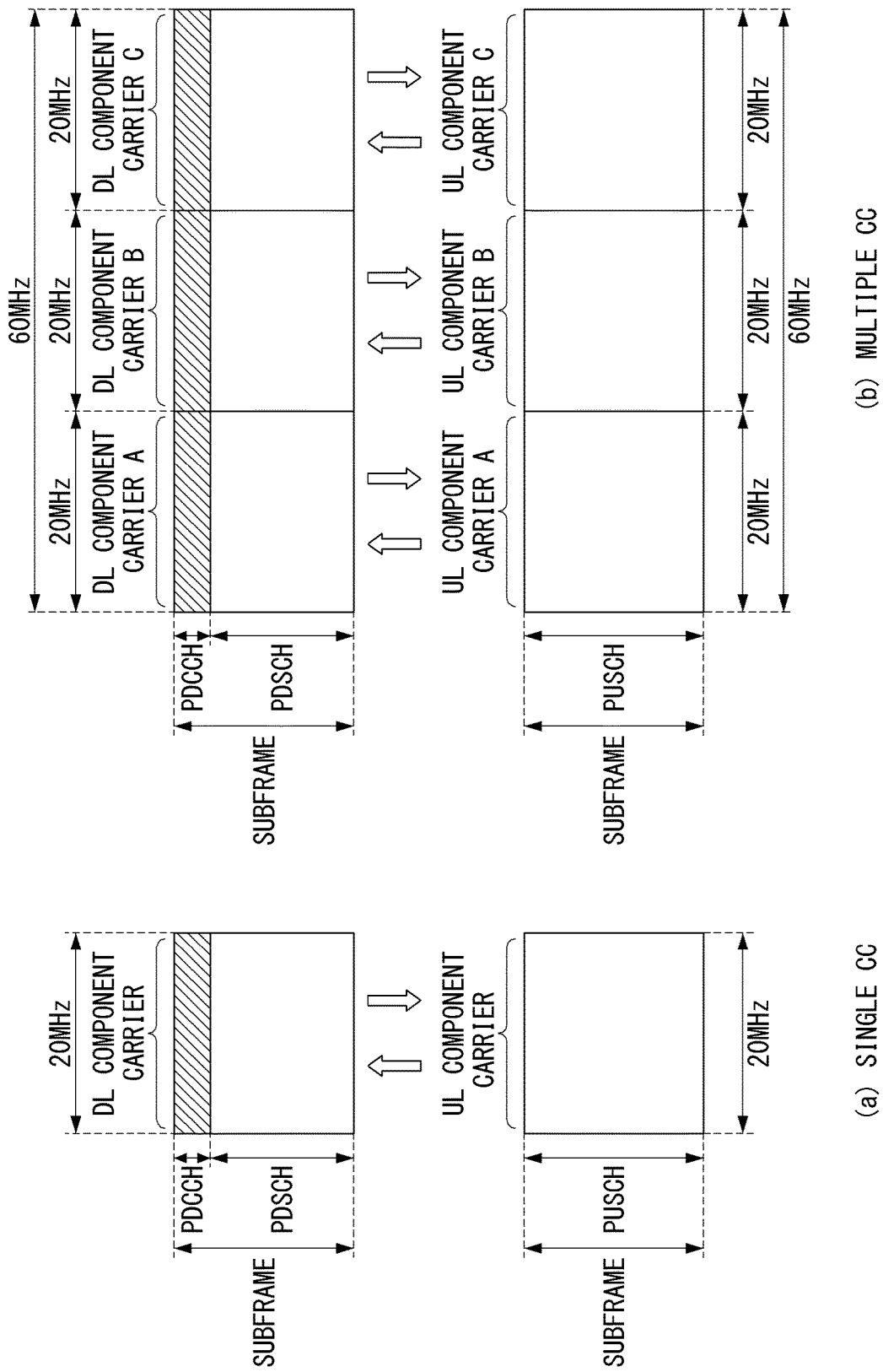
FIG. 5 illustrates one example of a component carrier and carrier aggregation in a wireless communication system to which the present disclosure may be applied.

FIG. 5 illustrates one example of a component carrier and carrier aggregation in a wireless communication system to which the present disclosure can be applied.

FIG. 5(*a*) shows a single carrier structure defined in the LTE system. Two types of component carriers are used: DL CC and UL CC. A component carrier may have frequency bandwidth of 20 MHz.

FIG. 5(*b*) shows a carrier aggregation structure used in the LTE A system. FIG. 5(*b*) shows a case where three component carriers having frequency bandwidth of 20 MHz are aggregated. In this example, 3 DL CCs and 3 UL CCs are employed, but the number of DL CCs and UL CCs is not limited to the example. In the case of carrier aggregation, the UE is capable of monitoring 3 CCs at the same time, capable of receiving a downlink signal/data and transmitting an uplink signal/data.

If a particular cell manages N DL CCs, the network may allocate M (M≤N) DL CCs to the UE. At this time, the UE may monitor only the M DL CCs and receive a DL signal from the M DL CCs. Also, the network may assign priorities for L (L≤M≤N) DL CCs so that primary DL CCs may be allocated to the UE; in this case, the UE has to monitor the L DL CCs. This scheme may be applied in the same manner to uplink transmission.

Linkage between a carrier frequency of downlink resources (or DL CC) and a carrier frequency of uplink resources (or UL CC) may be designated by a higher layer message such as an RRC message or system information. For example, according to the linkage defined by system information block type 2 (SIB2), a combination of DL resources and UL resources may be determined. More specifically, the linkage may refer to a mapping relationship between a DL CC through which a PDCCH carrying an UL grant is transmitted and an UL CC that uses the UL grant; or a mapping relationship between a DL CC (or an UL CC) through which data for HARQ signal are transmitted and an UL CC (or a DL CC) through which a HARQ ACK/NACK signal is transmitted.

Figure 6:
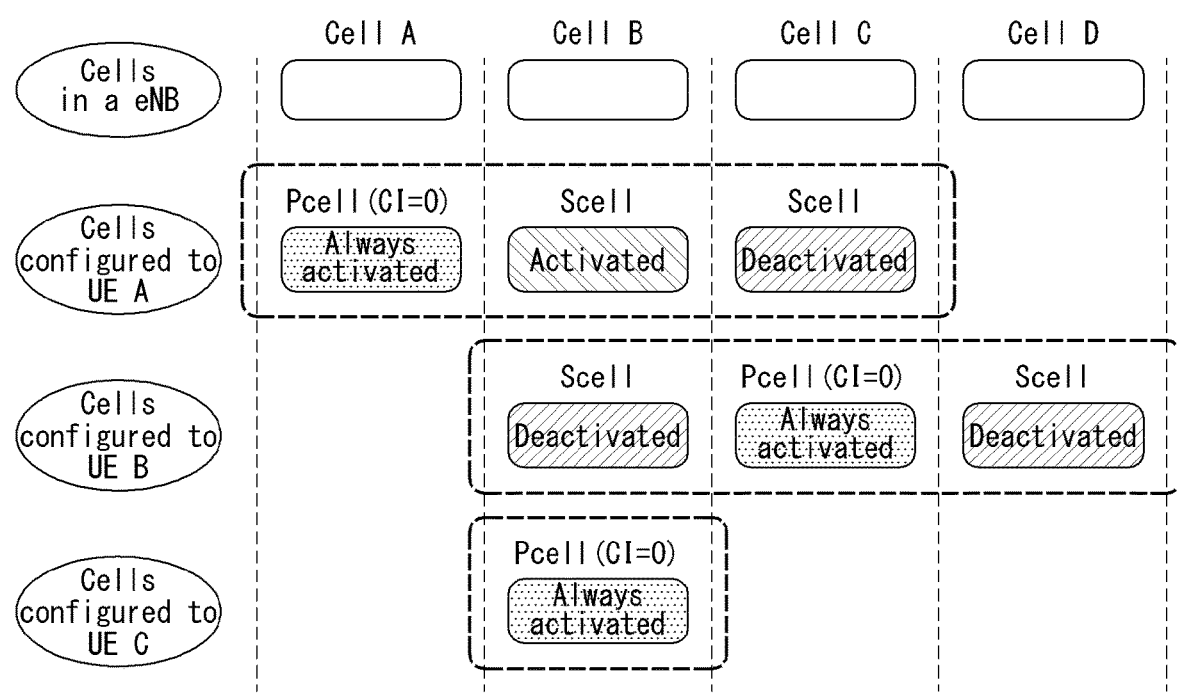
FIG. 6 illustrates an example where a system supporting carrier aggregation distinguishes cells.

FIG. 6 illustrates an example where a system supporting carrier aggregation distinguishes cells.

Referring to FIG. 6, a configured cell is a cell which is configured for carrier aggregation based on a measurement report among cells of an eNB and is configured for each UE as shown in FIG. 5. A configured cell may reserve a resource for ack/nack transmission in advance with respect to PDSCH transmission. An activated cell is a cell configured to actually transmit a PDSCH/PUSCH among the configured cells, which performs Channel State Information (CSI) reporting for PDSCH/PUSCH transmission and Sounding Reference Signal (SRS) transmission. A de-activated cell is a cell configured not to perform PDSCH/PUSCH transmission by a command from the eNB or timer operation, which may stop CSI reporting and SRS transmission.

Semi-Persistent Scheduling (SPS)

Semi-Persistent Scheduling (SPS) is a scheduling scheme in which resources are allocated to a specific UE so as to be continuously maintained for a specific time interval.

When a predetermined amount of data is transmitted for a specific time like Voice over Internet Protocol (VoIP), it is not necessary to transmit control information every data transmission interval for resource allocation, so the waste of the control information can be reduced by using the SPS scheme. In the so-called SPS method, a time resource region in which the resources may be allocated to the UE is first allocated.

In this case, in the semi-persistent allocation method, the time resource region allocated to the specific UE may be configured to have periodicity. Then, the allocation of time-frequency resources is completed by allocating a frequency resource region as necessary. The allocation of the frequency resource region may be referred to as so-called activation. When the semi-persistent allocation method is used, the resource allocation is maintained during a predetermined period by one signaling, repeated resource allocation need not be performed, thereby reducing signaling overhead.

Thereafter, when resource allocation for the UE is no longer needed, signaling for releasing frequency resource allocation may be transmitted from the eNB to the UE. Releasing the allocation of the frequency resource region may be referred to as deactivation.

In the current LTE, for the SPS for uplink and/or downlink, in which subframes the SPS is to be transmitted/received is first notified to the UE through Radio Resource Control (RRC) signaling. That is, the time resource is first allocated among the time-frequency resources allocated to the SPS through the RRC signaling. In order to notify the subframe which may be used, for example, a periodicity and an offset of the subframe may be notified. However, since the UE receives only the time resource region through RRC signaling, even if the UE receives the RRC signaling, the UE does not immediately perform transmission/reception by the SPS, and completes the time-frequency resource allocation by allocating the frequency resource region as necessary. The allocation of the frequency resource region may be referred to as activation and releasing the allocation of the frequency resource region may be referred to as deactivation.

Therefore, after receiving the PDCCH indicating activation, the UE allocates the frequency resource according to the RB allocation information included in the received PDCCH, and applies modulation and code rate depending on Modulation and Coding Scheme (MCS) information to start transmission/reception according to the subframe periodicity and offset allocated through the RRC signaling.

Then, the UE stops transmission/reception when receiving the PDCCH indicating the deactivation from the eNB. If a PDCCH indicating activation or reactivation is received after stopping transmission and reception, transmission and reception are resumed again with the subframe period and offset allocated by RRC signaling using an RB allocation or an MCS designated by the PDCCH. That is, the allocation of time resources is performed through RRC signaling, but the transmission and reception of the actual signal may be performed after receiving the PDCCH indicating the activation and reactivation of the SPS, and the interruption of the transmission and reception of the signal is performed by the PDCCH indicating the deactivation of the SPS.

Specifically, when the SPS is activated by the RRC, the following information may be provided.

SPS C-RNTI

When SPS for uplink is activated, uplink SPS interval (semiPersistSchedIntervalUL) and the number of empty transmission before implicit release In case of TDD, whether twoIntervalsConfig is activated or deactivated for uplink When SPS for downlink is activated, downlink SPS interval (semiPersistSchedIntervalDL) and the number of HARQ processes configured for SPS Unlike this, when the SPS is deactivated by the RRC, a configured grant or a configured assignment should be discarded.

Further, the SPS is supported only in SpCell and is not supported for RN communication with E-UTRAN together with an RN subframe configuration.

In relation to the downlink SPS, after the semi-persistent downlink assignment is configured, the MAC entity needs to consider sequentially that the N-th assignment occurs in a subframe, as shown in Equation 1 below.

(10*SFN+subframe)=[(10*SFNstart time+subframe-start time)+$N$*semiPersistSchedIntervalDL] modulo 10240     [Equation 1]

In Equation 1, $SFN_{start\ time}$ and $subframe_{start\ time}$ mean SFN and subframe in which the configured downlink assignment is (re)initialized, respectively. For BL UEs or UEs of enhanced coverage, the $SFN_{start\ time}$ and $subframe_{start\ time}$ may refer to the SFN and subframe of the first PDSCH transmission in which the configured downlink assignment is (re)initialized.

In contrast, in relation to the uplink SPS, after the semi-persistent uplink assignment is configured, the MAC entity needs to consider sequentially that the N-th grant occurs in the subframe, as shown in Equation 2 below.

(10*SFN+subframe)=[(10*SFNstart time+subframe-start time)+$N$*semiPersistSchedIntervalUL+Subframe_Offset*($N$ modulo 2)]modulo 10240     [Equation 2]

In Equation 2, $SFN_{start\ time}$ and $subframe_{start\ time}$ mean SFN and subframe in which the configured uplink grant is (re)initialized, respectively. For the BL UEs or the UEs of enhanced coverage, the $SFN_{start\ time}$ and $subframe_{start\ time}$ may refer to the SFN and subframe of the first PDSCH transmission in which the configured uplink grant is (re) initialized.

Table 3 below is an example of an RRC message (SPS-Config) for specifying the above-described SPS configuration.

TABLE 3

```
-- ASN1START
SPS-Config ::=          SEQUENCE {
       semiPersistSchedC-RNTI                          C-RNTI
       OPTIONAL,                       -- Need OR
       sps-ConfigDL                                    SPS-ConfigDL
       OPTIONAL,                       -- Need ON
       sps-ConfigUL                                    SPS-ConfigUL
       OPTIONAL                        -- Need ON
}
SPS-ConfigDL ::=        CHOICE{
       release                                         NULL,
       setup                                           SEQUENCE {
              semiPersistSchedIntervalDL              ENUMERATED {
              sf10, sf20, sf32, sf40, sf64, sf80,
              sf128, sf160, sf320, sf640, spare6,
              spare5, spare4, spare3, spare2,
              spare1},
              numberOfConfSPS-Processes               INTEGER (1..8),
              n1PUCCH-AN-PersistentList               N1PUCCH-AN-PersistentList,
              ...,
              [[      twoAntennaPortActivated-r10     CHOICE {
                             release
       NULL,
                             setup
       SEQUENCE {
                                    n1PUCCH-AN-PersistentListP1-r10 N1PUCCH-AN-PersistentList
                             }
              }
                                                                                OPTIONAL --
```

TABLE 3-continued

```
Need ON
                            ]]
        }
}
SPS-ConfigUL ::=        CHOICE {
        release                                                         NULL,
        setup                                                           SEQUENCE {
                semiPersistSchedIntervalUL              ENUMERATED {
                sf10, sf20, sf32, sf40, sf64, sf80,
                sf128, sf160, sf320, sf640, spare6,
                spare5, spare4, spare3, spare2,
                spare1},
                implicitReleaseAfter                    ENUMERATED {e2, e3, e4, e8},
                p0-Persistent                                           SEQUENCE {
                        p0-NominalPUSCH-Persistent              INTEGER (-126..24),
                        p0-UE-PUSCH-Persistent                          INTEGER (-8..7)
                }                       OPTIONAL,
                                                        -- Need OP
                twoIntervalsConfig                      ENUMERATED {true}
                OPTIONAL, -- Cond TDD
                ...,
                [[      p0-PersistentSubframeSet2-r12   CHOICE {
                                        release
                NULL,
                                        setup
                SEQUENCE {
                                        p0-Nominal PUSCH-PersistentSubframeSet2-r12
                INTEGER (-126..24),
                                        p0-UE-PUSCH-PersistentSubframeSet2-r12
                INTEGER (-8..7)
                                }
                        }
                                                                        OPTIONAL -- Need ON
                ]],
                [[      numberOfConfUISPS-Processes-r13                 INTEGER (1..8)
                OPTIONAL -- Need OR
                ]]
        }
}
N1PUCCH-AN-PersistentList ::=           SEQUENCE (SIZE (1.4)) OF INTEGER (0..2047)
-- ASN1STOP
```

PDCCH/EPDCCH/MPDCCH Validation for Semi-Persistent Scheduling

The UE may validate the PDCCH including the SPS indication when all of the following conditions are satisfied. First, the CRC parity bit added for the PDCCH payload should be scrambled with the SPS C-RNTI, and second, a New Data Indicator (NDI) field should be configured to zero. Here, in the case of DCI formats 2, 2A, 2B, 2C, and 2D, the new data indicator field indicates one of the activated transport blocks.

Further, the UE may validate the EPDCCH including the SPS indication when all of the following conditions are satisfied. First, the CRC parity bit added for the EPDCCH payload should be scrambled with the SPS C-RNTI, and second, the New Data Indicator (NDI) field should be configured to zero. Here, in the case of DCI formats 2, 2A, 2B, 2C, and 2D, the new data indicator field indicates one of the activated transport blocks.

Further, the UE may validate the MPDCCH including the SPS indication when all of the following conditions are satisfied. First, the CRC parity bit added for the MPDCCH payload should be scrambled with the SPS C-RNTI, and second, the New Data Indicator (NDI) field should be configured to zero.

When each field used for the DCI format is configured according to Table 4 or Table 5, Table 6, and Table 7 below, the validation is completed. When the validation is completed, the UE recognizes the received DCI information as valid SPS activation or deactivation (or release). On the other hand, when the validation is not completed, the UE recognizes that the non-matching CRC is included in the received DCI format.

Table 4 shows fields for PDCCH/EPDCCH validation indicating SPS activation.

TABLE 4

|  | DCI format 0 | DCI format 1/1A | DCI format 2/2A/2B/2C/2D |
| --- | --- | --- | --- |
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

Table 5 shows fields for PDCCH/EPDCCH validation indicating SPS deactivation (or release).

TABLE 5

| | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

Table 6 shows fields for MPDCCH validation indicating SPS activation.

TABLE 6

| | DCI format 6-0A | DCI format 6-1A |
|---|---|---|
| HARQ process number | set to '000' | FDD: set to '000' TDD: set to '0000 |
| Redundancy version | set to '00' | set to '00' |
| TPC command for scheduled PUSCH | set to '00' | N/A |
| TPC command for scheduled PUCCH | N/A | set to '00' |

Table 7 shows fields for MPDCCH validation indicating SPS deactivation (or release).

TABLE 7

| | DCI format 6-0A | DCI format 6-1A |
|---|---|---|
| HARQ process number | set to '000' | FDD: set to '000' TDD: set to '0000 |
| Redundancy version | set to '00' | set to '00' |
| Repetition number | set to '00' | set to '00' |
| Modulation and coding scheme | set to '1111' | set to '1111' |
| TPC command for scheduled PUSCH | set to '00' | N/A |
| Resource block assignment | Set to all '1's | Set to all '1's |

When the DCI format indicates SPS downlink scheduling activation, the TPC command value for the PUCCH field may be used as an index indicating four PUCCH resource values set by a higher layer.

Table 8 shows PUCCH resource values for downlink SPS.

TABLE 8

| Value of 'TPC command for PUCCH' | $n_{PUCCH}^{(1,p)}$ |
|---|---|
| '00' | The first PUCCH resource value configured by the higher layers |
| '01' | The second PUCCH resource value configured by the higher layers |
| '10' | The third PUCCH resource value configured by the higher layers |
| '11' | The fourth PUCCH resource value configured by the higher layers |

Downlink Control Channel-Related Procedure in NB-IoT

In what follows, a procedure related to Narrowband Physical Downlink Control Channel (NPDCCH) used for NB-IoT will be described.

A UE has to monitor NPDCCH candidates (i.e., a set of NPDCCH candidates) according to the control information configured by higher layer signaling. Here, the monitoring may indicate attempting to decode individual NPDCCHs belonging to the set according to all of the monitored DCI formats. The set of NPDCCH candidates to monitor may be defined in terms of NPDCCH search spaces. In this case, the UE may perform monitoring using identifiers (for example, C-RNTI, P-RNTI, SC-RNTI, or G-RNTI) corresponding to the respective NPDCCH search spaces.

In this case, the UE needs to monitor one or more of the following search spaces: a) Type1-NPDCCH common search space, b) Type2-NPDCCH common search space, and c) NPDCCH UE-specific search space. At this time, the UE is not required to monitor the NPDCCH UE-specific search space and the Type1-NPDCCH common search space simultaneously. Also, the UE is not required to monitor the NPDCCH UE-specific search space and the Type2-NPDCCH common search space simultaneously. Also, the UE is not required to monitor the Type1-NPDCCH common search space and the Type2-NPDCCH common search space simultaneously.

The NPDCCH search spaces at aggregation and repetition levels are defined by a set of NPDCCH candidates. Here, each NPDCCH candidate is repeated in R consecutive NB-IoT downlink subframes except for subframes used for transmission of System Information (SI) messages starting from the subframe k.

In the case of the NPDCCH UE-specific search space, the aggregation and repetition levels defining the search space and the corresponding NPDCCH candidates being monitored are listed in Table 9, where the RMAX value is replaced with the parameter al-Repetition-USS configured by the higher layer.

TABLE 9

| | | NCCE indices of monitored NPDCCH candidates | |
|---|---|---|---|
| $R_{max}$ | R | L' = 1 | L' = 2 |
| 1 | 1 | {0}, {1} | {0, 1} |
| 2 | 1 | {0}, {1} | {0, 1} |
| | 2 | — | {0, 1} |
| 4 | 1 | — | {0, 1} |
| | 2 | — | {0, 1} |
| | 4 | — | {0, 1} |
| >=8 | $R_{max}/8$ | — | {0, 1} |
| | $R_{max}/4$ | — | {0, 1} |
| | $R_{max}/2$ | — | {0, 1} |
| | $R_{max}$ | — | {0, 1} |

Note 1:
{x}, {y} denotes NPDCCH format 0 candidate of NCCE index 'x' and NPDCCH format 0 candidate of NCCE index 'y'.
Note 2:
{x, y} denotes NPDCCH format 1 candidate corresponding to NCCE indexes 'x' and 'y'.

In the case of the Type 1-NPDCCH common search space, the aggregation and repetition levels defining the search spaces and the NPDCCH candidates being monitored are listed in Table 10, where the RMAX value is replaced with the parameter al-Repetition-CSS-Paging configured by the higher layer.

TABLE 10

| $R_{max}$ | R | L' = 1 | NCCE indices of monitored NPDCCH candidates L' = 2 |
|---|---|---|---|
| 1 | 1 | — | {0, 1} |
| 2 | 1, 2 | — | {0, 1} |
| 4 | 1, 2, 4 | — | {0, 1} |
| 8 | 1, 2, 4, 8 | — | {0, 1} |
| 16 | 1, 2, 4, 8, 16 | — | {0, 1} |
| 32 | 1, 2, 4, 8, 16, 32 | — | {0, 1} |
| 64 | 1, 2, 4, 8, 16, 32, 64 | — | {0, 1} |
| 128 | 1, 2, 4, 8, 16, 32, 64, 128 | — | {0, 1} |
| 256 | 1, 4, 8, 16, 32, 64, 128, 256 | — | {0, 1} |
| 512 | 1, 4, 16, 32, 64, 128, 256, 512 | — | {0, 1} |
| 1024 | 1, 8, 32, 64, 128, 256, 512, 1024 | — | {0, 1} |
| 2048 | 1, 8, 64, 128, 256, 512, 1024, 2048 | — | {0, 1} |

Note 1:
{x}, {y} denotes NPDCCH format 0 candidate of NCCE index 'x' and NPDCCH format 0 candidate of NCCE index 'y'.
Note 2:
{x, y} denotes NPDCCH format 1 candidate corresponding to NCCE indexes 'x' and 'y'.

In the case of the Type 2-NPDCCH common search space, the aggregation and repetition levels defining the search spaces and the NPDCCH candidates being monitored are in Table 11, where the RMAX value is replaced with the parameter npdcch-MaxNumRepetitions-RA configured by the higher layer.

TABLE 11

| $R_{max}$ | R | L' = 1 | NCCE indices of monitored NPDCCH candidates L' = 2 |
|---|---|---|---|
| 1 | 1 | — | {0, 1} |
| 2 | 1 | — | {0, 1} |
|   | 2 | — | {0, 1} |
| 4 | 1 | — | {0, 1} |
|   | 2 | — | {0, 1} |
|   | 4 | — | {0, 1} |
| >=8 | $R_{max}/8$ | — | {0, 1} |
|   | $R_{max}/4$ | — | {0, 1} |
|   | $R_{max}/2$ | — | {0, 1} |
|   | $R_{max}$ | — | {0, 1} |

Note 1:
{x}, {y} denotes NPDCCH format 0 candidate of NCCE index 'x' and NPDCCH format 0 candidate of NCCE index 'y'.
Note 2:
{x, y} denotes NPDCCH format 1 candidate corresponding to NCCE indexes 'x' and 'y'.

At this time, the locations of the starting subframe k are given by k=kb. Here, kb indicates the b-th consecutive NB-IoT downlink subframe from subframe k0, b is u×R, and u ranges 0, 1, . . . , (RMAX/R)−1. Also, subframe k0 indicates a subframe satisfying the condition of Eq. 3.

$$(10n_f + \lfloor n_s/2 \rfloor) \bmod T = \alpha_{offset} \cdot T, \text{ where } T = R_{max} \cdot G \quad [\text{Eq. 3}]$$

In the case of the NPDCCH UE-specific search space, G appearing in Eq. 1 is given by the higher layer parameter nPDCCH-startSF-UESS, and $\alpha_{offset}$ is given by the higher layer parameter nPDCCH-StartSFoffset-UESS. Also, in the case of the Type2-NPDCCH common search space, G appearing in Eq. 3 is given by the higher layer parameter nPDCCH-startSF-Type2CSS, and $\alpha_{offset}$ is given by the higher layer parameter nPDCCH-startSFoffset-Type2CSS. Also, in the case of Type1-NPDCCH common search space, k is k0 and is determined based on the position of an NB-IoT paging opportunity subframe.

When a UE is configured with a PRB for monitoring the NPDCCH UE-specific search space by the higher layer, the UE has to monitor the NPDCCH UE-specific search space in the PRB configured by the higher layer. In this case, the UE is not expected to receive NPSS, NSSS, and NPBCH from the corresponding PRB. On the other hand, if the PRB is not configured by the higher layer, the UE has to monitor the NPDCCH UE-specific search space on the same PRB from which the NPSS/NSSS/NPBCH has been detected.

When an NB-IoT UE detects an NPDCCH with DCI format N0 which ends at subframe n, and transmission of the corresponding NPUSCH format 1 is started from subframe n+k, the UE is not required to monitor the NPDCCH in any subframe starting from subframe n+1 to subframe n+k−1.

Also, when an NB-IoT UE detects an NPDCCH with DCI format N1 or N2 which ends at subframe n; and transmission of the corresponding NPDSCH is started from subframe n+k, the UE is not required to monitor the NPDCCH in any subframe starting from subframe n+1 to subframe n+k−1.

Also, when an NB-IoT UE detects an NPDCCH with DCI format N1 which ends at subframe n, and transmission of the corresponding NPUSCH format 2 is started from subframe n+k, the UE is not required to monitor the NPDCCH in any subframe starting from subframe n+1 to subframe n+k−1.

Also, when an NB-IoT UE detects an NPDCCH with DCI format N1 for "PDCCH order", which ends at subframe n, and transmission of the corresponding NPRACH is started from subframe n+k, the UE is not required to monitor the NPDCCH in any subframe starting from subframe n+1 to subframe n+k−1.

Also, when an NB-IoT UE performs NPUSCH transmission which ends at subframe n, the UE is not required to monitor the NPDCCH in any subframe starting from subframe n+1 to subframe n+3.

Also, when an NB-IoT UE performs NPUSCH transmission which ends at subframe n, the UE is not required to monitor the NPDCCH in any subframe starting from subframe n+1 to subframe n+3.

With respect to the NPDCCH starting position, the starting OFDM symbol of the NPDCCH is given by the index $l_{NPDCCHStart}$ in the first slot of subframe k. At this time, the higher layer parameter operationModeInfo is '00' or '01', the index $l_{NPDCCHStart}$ is given by the higher layer parameter operationModeInfo. On the other hand, if the higher layer parameter operationModeInfo indicates '10' or '11', the index $l_{NPDCCHStart}$ is 0.

Downlink Control Information (DCI) Format

DCI transmits downlink or uplink scheduling information for one cell and one RNTI. Here, the RNTI is implicitly encoded with CRC.

As a DCI format related to NB-IoT, a DCI format N0, DCI format N1, and DCI format N2 may be considered.

First, the DCI format N0 is used for scheduling an NPUSCH in one uplink (UL) cell and may transmit the following information.

Flag (for example, 1 bit) for distinguishing the format N0 and the format N1 from each other, wherein the value of 0 may indicate the format N0, and the value of 1 the format N1.
 Subcarrier indication (for example, 6 bits)
 Resource assignment (for example, 3 bits)
 Scheduling delay (for example, 2 bits)
 Modulation and coding scheme (for example, 4 bits)
 Redundancy version (for example, 1 bit)
 Repetition number (for example, 3 bits)
 New data indicator (for example, 1 bit)
 DCI subframe repetition number (for example, 2 bits)

Next, the DCI format N1 is used for scheduling one NPDSCH codeword in one cell and a random access procedure initiated by NPDCCH order. At this time, the DCI corresponding to the NPDCCH order may be carried by an NPDCCH.

The DCI format N1 may transmit the following information.

Flag (for example, 1 bit) for distinguishing the format N0 and the format N1 from each other, wherein the value of 0 may indicate the format N0, and the value of 1 the format N1.

The format N1 is used for a random access procedure initiated by NPDCCH order only when an NPDCCH order indicator is set to '1', Cyclic Redundancy Check (CRC) of the format N1 is scrambled with the C-RNTI, and all of the remaining fields are configured as follows.

Starting number of NPRACH repetitions (for example, 2 bits)
Subcarrier indication of NPRACH (for example, 6 bits)
All of the remaining bits of the format N1 are set to '1'.
Otherwise, the remaining information as shown below is transmitted.
Scheduling delay (for example, 3 bits)
Resource assignment (for example, 3 bits)
Modulation and coding scheme (for example, 4 bits)
Repetition number (for example, 4 bits)
New data indicator (for example, 1 bit)
HARQ-ACK resource (for example, 4 bits)
DCI subframe repetition number (for example, 2 bits)

When the CRC of the format N1 is scrambled with the RA-RNTI, the following information (i.e., field), among the information (i.e., fields), is reserved.

New data indicator
HARQ-ACK resource offset

At this time, if the number of information bits of the format N1 is smaller than the number of information bits of the format N0, '0's have to be appended until the payload size of the format n1 becomes the same as the payload size of the format N0.

Next, the DCI format N2 is used for paging and direct indication; and may transmit the following information.

Flag (for example, 1 bit) for distinguishing paging and direct indication, where the value of 0 may represent direct indication, and the value of 1 may represent paging.

When a value of the flag is 0, the DCI format N2 includes (or transmits) direct indication information (for example, 8 bits) and reserved information bits for configuring the size to be the same as the format N2 where the flag value is 1.

Meanwhile, if a value of the flag is 1, the DCI format N2 includes (or transmits) resource allocation (for example, 3 bits), modulation and coding scheme (for example, 4 bits), repetition number (for example, 4 bits), and DCI subframe repetition number (for example, 3 bits).

As described above, Narrowband (NB)-LTE refers to a system for supporting low complexity and low power consumption, having system bandwidth (BW) corresponding to one physical resource block (PRB) of the LTE system.

That is, the NB-LTE system may be primarily used as a communication mode for implementing the internet of things (IoT) by supporting a device (or UE) such as machine-type communication (MTC) in a cellular system. That is, the NB-LTE system may also be referred to as NB-IoT.

Further, the NB-IoT system does not need to allocate an additional band for the NB-IoT system by using the same OFDM parameters such as the subcarrier spacing used in the existing LTE system, as the LTE system. In this case, 1 PRB of the legacy LTE system band is allocated for the NB-IoT, which is advantageous in using the frequency efficiently.

The physical channel of the NB-IoT system may be defined as N-Primary Synchronization Signal (N-PSS), N-Secondary Synchronization Signal (N-SSS), N-Physical Channel (N-PBCH), N-PDCCH/N-EPDCCH, N-PDSCH, or the like in the case of downlink. Here, 'N-' may be used for distinguishing from the legacy LTE.

For legacy LTE and LTE MTC systems, Semi-Persistent Scheduling (SPS) is introduced.

Initially, the UE may receive information (SPS configuration setup information) on setting up the SPS configuration through higher layer signaling (e.g., RRC signaling). Subsequently, when the UE receives the control information for activating the SPS (that is, SPS activation DCI), the SPS configuration information received through higher layer signaling, scheduling information included in the control information, and Modulation and Coding Scheme (MCS) may be used to operate the SPS.

When the UE receives control information (that is, SPS release DCI) for deactivating (or releasing) the SPS, the SPS may be released. Thereafter, when the UE receives the SPS activation DCI, the SPS may be operated again as described above.

If, after receiving the SPS release DCI, the UE receives the SPS configuration release information through the higher layer signaling, the corresponding UE may not decode the SPS activation DCI until the terminal receives the SPS configuration setup information again.

As mentioned above, in the legacy LTE system, the eNB may transmit semiPersistSchedC-RNTI, semiPersistSchedIntervalDL, numberOfConfSPS-Processes, etc., to the UE through the higher layer signaling (i.e., RRC signaling). Here, the semiPersistSchedC-RNTI value refers to the SPS-C-RNTI value, the semiPersistSchedIntervalDL value refers to a value representing the interval in which SPS is performed in units of subframes, and the numberOfConfSPS-Processes value refers to the number of HARQ processes (HARQ process number) used in the SPS.

The above-described SPS operation basically has the advantage of reducing the DCI overhead of the eNB. In addition, in addition to reducing the DCI overhead of the eNB in the NB-IoT system, the introduction of the SPS may be considered in order to reduce battery usage and/or latency reduction of the NB-IoT UE.

Specifically, when the SPS operation is introduced, since the resource region to which the N-PDCCH is transmitted is reduced, the NB-IoT system using 1 PRB may enable more efficient resource operation.

In view of this, this specification proposes a method of configuring the higher layer signaling and/or control information (i.e., DCI) and the like which may be considered when introducing the SPS into the NB-IoT system and a method for maintaining the existing complexity. In this case, even in the NB-IoT system, the information on the SPS-C-RNTI value and the SPS interval may be configured to be transmitted through the higher layer signaling.

In general, the NB-IoT UE may be divided into a UE supporting a single HARQ process and a UE supporting multiple HARQ processes (e.g., two HARQ processes). Here, the UE supporting the single HARQ process may mean a UE capable of performing only one HARQ operation at the same time and the UE supporting the multiple HARQ processes may mean a UE capable of simultaneously performing multiple HARQ operations.

Hereinafter, the SPS operation proposed in this specification is described by dividing into a case in which the UE may support the single HARQ process and a case in which the UE may support the multiple HARQ processes.

Further, the embodiments described hereinbelow are just distinguished for convenience of the description and some configurations or features of a predetermined embodiment may be included in other embodiments or may be replaced with corresponding configurations or features of other embodiments. For example, hereinafter, a scheme to be described in a second embodiment may be additionally applied to the scheme described in the first embodiment or vice versa.

In addition, monitoring the search space in this specification may mean a process in which the corresponding CRC is scrambled with a predetermined specific RNTI value after decoding the N-PDCCH of a specific area according to the DCI format to be received through the search space to check whether the corresponding value matches (i.e., coincides with) a desired value.

In addition, in the case of the NB-IoT system, since each UE recognizes a single PRB as each carrier, the PRB referred to herein may be interpreted as the same meaning as the carrier.

In addition, DCI format N0, DCI format N1, and DCI format N2 referred to herein may refer to DCI format N0, DCI format N1, and DCI format N2 described above (e.g., defined in the 3GPP specification).

In addition, for convenience of description, in this specification, an anchor-type PRB (or anchor-type carrier) may mean a PRB for transmitting the N-PDSCH for N-PSS, N-SSS, N-PBCH, and system information block (N-SIB) for the initial access in terms of the eNB. In this case, there may be one anchor-type PRB, or there may be multiple anchor-type PRBs. In addition, in this specification, when there are one or multiple anchor-type PRBs as described above, the specific anchor-type PRB selected by the UE through the initial access is an anchor PRB (or anchor carrier). In addition, in this specification, a PRB allocated from the eNB to perform a downlink process (or procedure) after the initial access may be referred to (or defined) as an additional PRB (or additional carrier).

First Embodiment—SPS Operating Method for NB-IoT UE Supporting Single HARQ

First, when the SPS is introduced in the NB-IoT system, a method of maintaining the complexity of the UE supporting the single HARQ will be described. That is, a method for performing the SPS operation while maintaining the complexity of the UE supporting the single HARQ process as described above will be described below.

Basically, the UE may be configured to receive information (i.e., SPS configuration information) related to the SPS configuration through the higher layer signaling (e.g., RRC signaling). At this time, the SPS configuration information may include an SPS-C-RNTI value, information indicating the interval at which the SPS is transmitted, and the like. Here, the value representing the interval at which the SPS is transmitted may be expressed based on a DL valid subframe. The downlink valid subframe may mean a subframe in which the NB-IoT UE may effectively receive a downlink signal and/or a channel from the eNB.

Upon receiving the SPS configuration information through the higher layer signaling, the UE may monitor a search space (i.e., a user-specific search space (USS)) allocated to the corresponding UE using the SPS-C-RNTI value.

In this case, a method for configuring a specific field of the DCI to a specific value may be considered according to each case in order to validate the SPS activation or release.

For example, as the method for validating the SPS activation or release using DCI format N1 for DL grant, a method for representing the activation or release by setting the New Data Indication (NDI) field to 1 (or 0) and using '0' and '1' by newly adding the SPS activation/release field may be considered. Here, the SPS activation/deactivation field may be referred to as an SPS indication field.

Alternatively, as another example, a method for representing the activation or release by using an existing specific 1 bit field or Most Significant Bit (MSB) (alternatively, Least Significant Bit (LSB)) of a specific field may also be considered when DCI format N1 is scrambled with an SPS-C-RNTI without adding a new field (i.e., SPS activation/release field). Specifically, when DCI format N1 is scrambled with the SPS-C-RNTI, the UE uses the corresponding control information for the SPS activation when the NPDCCH order indicator field is 1 and uses the control information for the SPS release when the NPDCCH order indicator is 0. In this case, the reverse case is also possible.

That is, the SPS activation/release field referred to herein below may be replaced with a specific 1 bit field included in the existing DCI or 1 bit such as MSB or LSB of the specific field.

At this time, the value of the NDI field may also be configured to a specific value (for example, 0 or 1) for the SPS activation or release. In addition, the DCI format N1 including information for the SPS activation or release may be configured to have the same size as DCI format N1 scrambled with another RNTI (e.g., C-RNTI, RA-RNTI) so as not to increase the number of blind decodings (BDs) of the UE.

When the UE detects (or receives) the SPS activation DCI, the SPS operation may be started (that is, the SPS operation is activated) in consideration of the MCS, the number of repetitions, the number of PDCCH repetitions, HARQ resources, etc. included in the DCI.

After the SPS operation is started (i.e., activated), the SPS release operation may be performed according to at least one of the following three methods (methods 1 to 3).

First, a method (method 1) for configuring the UE to continuously perform the SPS operation until the UE detects an SPS release DCI in which the SPS activation/release field is configured to a value corresponding to release may be considered. In this case, there is an advantage that the SPS operation may be dynamically controlled.

Alternatively, the SPS activation/release field may be used only for the purpose of the activation, and a method (method 2) for additionally delivering information on SPS release timing through the corresponding SPS activation DCI may be considered. In this case, although an additional field may be required in the DCI, there is an advantage of dynamically controlling the SPS operation. Alternatively, a specific field included in the existing DCI may be used to deliver the information on the SPS release timing.

Alternatively, a method (method 3) for delivering the information on the release timing through the higher layer signaling (e.g., RRC message) through which the initial SPS configuration information is transmitted may also be considered. At this time, the SPS operation may always be performed only during the same period and the same duration. If the method is used, an additional field for delivering information related to release is not required for the SPS activation DCI, and the UE does not need to monitor all search spaces (e.g., USS) in a specific case.

In addition, in a wireless communication system supporting NB-IoT, it is assumed that each UE receives configuration information for the search space thereof (i.e., USS of each UE) through the higher layer. Based on the configuration information, the USS region and the PDCCH period of each UE may be determined.

Here, the PDCCH period may mean an interval between two consecutive PDCCH occasions. In one example, the PDCCH period may be configured using a subframe unit.

In relation to the above-described SPS operation, the UE may initially receive information indicating that the SPS interval is N DL valid subframes (where N is a positive integer) and the SPS-C-RNTI value as a specific RNTI value through the higher layer signaling. In this case, the UE may monitor the USS region thereof and receive the SPS activation DCI transmitted through the NPDCCH.

Alternatively, the UE may be configured to receive the number of N downlink subframes rather than the number of N downlink valid subframes through the higher layer signaling. In this case, a downlink subframe configured to an NPDSCH (i.e., an SPS NPDSCH) position received according to the SPS may not be a downlink valid subframe for the NB-IoT UE. Therefore, in such a situation, the SPS NPDSCH may be configured to be transmitted from the downlink valid subframe to be transmitted immediately after.

In this case, the UE supporting the single HARQ may be configured not to monitor a specific search space among the search spaces configured for the UE. A detailed example thereof is illustrated in FIG. 7.

Figure 7:
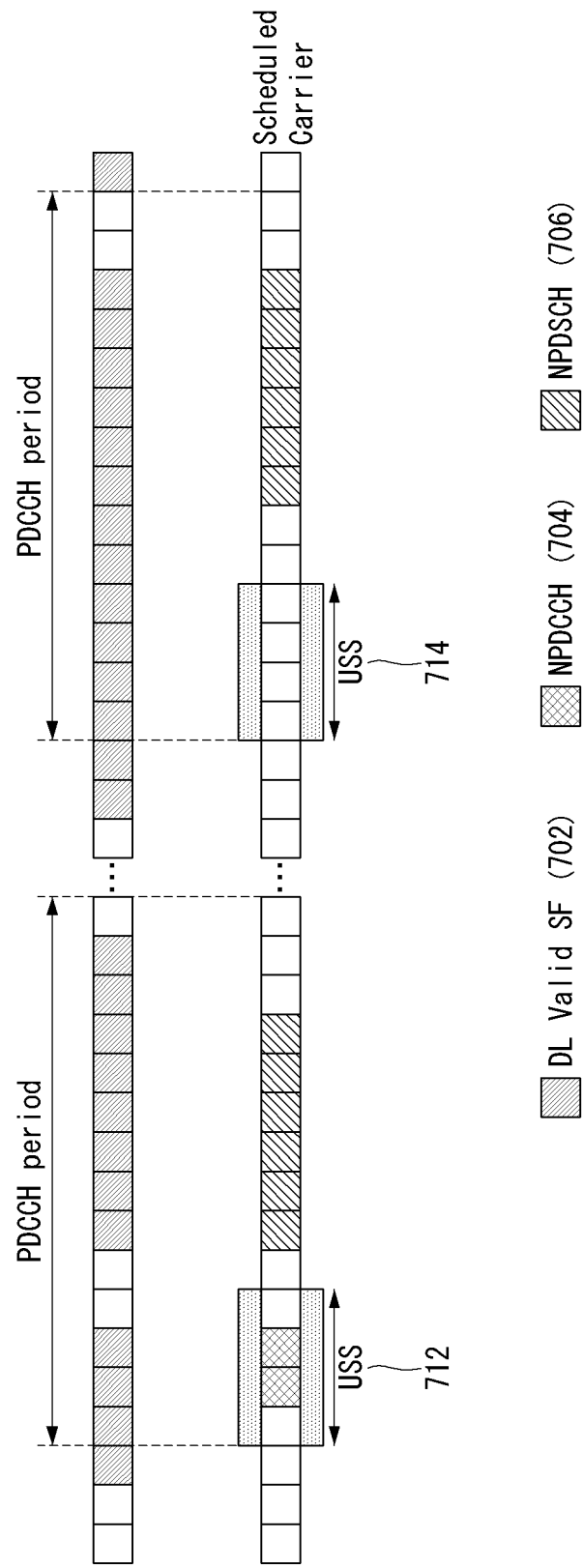
FIG. 7 illustrates an example of an SPS operation to which a method proposed in this specification may be applied.

FIG. 7 illustrates an example of an SPS operation to which a method proposed in this specification may be applied. FIG. 7 is just for convenience of the description and does not limit the scope of the present disclosure.

Referring to FIG. 7, it is assumed that the UE receives configuration information for determining the USS and PDCCH thereof through the higher layer signaling, and the PDCCH period includes 14 subframes. That is, in FIG. 7, each square may mean a subframe unit in a carrier configured for the corresponding NB-IoT.

In addition, the DL Valid SF 702 may mean a downlink valid subframe available by the corresponding NB-IoT UE, and NPDCCH 704 may man a region in which the NPDCCH for the NB-IoT UE is transmitted and NPDSCH 706 may mean a region in which the NPDSCH for the NB-IoT UE is transmitted.

In this case, the NPDCCH belonging to a first USS 712 means the NPDCCH in which the SPS activation DCI is delivered. The NPDSCH located next to the first USS and the NPDSCH positioned spaced apart from the SPS interval (e.g., N downlink valid subframes) based on the starting subframe (i.e., a starting downlink valid subframe) of the corresponding NPDSCH may mean NPDSCH allocated according to the SPS configuration.

In this case, in order to satisfy the complexity of the UE corresponding to the single HARQ, the UE may be configured not to monitor the USS corresponding to the remaining NPDSCH except the first allocated NPDSCH among the allocated NPDSCHs according to the SPS configuration. In the case of FIG. 7, the UE may be configured not to monitor a second USS 714.

For example, the UE may be configured not to monitor a USS region that may exist within T ms (where T is a positive integer) (e.g., 4 ms) from the transmission start subframe of each of the remaining NPDSCHs.

Here, T ms may mean an interval in which the NPDCCH and the NPDSCH are transmitted at a minimum distance. In addition, T ms (i.e., USS not monitored) may be configured according to a PDCCH period and/or an SPS interval configured through the higher layer signaling.

Since the eNB is configured to transmit downlink data (DL data) from the allocated NPDSCH region to the UE according to the SPS configuration, the eNB needs to additionally transmit the NPDCCH to the UE in the USS corresponding to the allocated NPDSCH region according to the SPS configuration.

Accordingly, the UE does not perform a monitoring operation for the corresponding USS by recognizing that the NPDCCH is not transmitted in the corresponding USS in advance, thereby reducing battery consumption of the UE.

In addition, in relation to the above-described SPS operation, after the above-mentioned SPS is activated, another NPDCCH may be transmitted in the search space (i.e., USS) of the UE in an unallocated downlink valid subframe. As an example, the other NPDCCH may mean an NPDCCH for SPS retransmission, a new general NPDCCH, or the like. Here, the SPS retransmission may mean an operation performed when the UE does not receive the NPDSCH allocated to the SPS.

That is, even if the SPS of the UE is activated, the UE may be configured to continuously monitor the USS region configured through the higher layer signaling. At this time, it is assumed that NPDSCH or NPUSCH is not scheduled at a time corresponding to the USS region.

In this case, since the UE continuously monitors the USS region configured through the higher layer signaling, a new NPDSCH may be received through SPS retransmission before the next SPS allocation time (i.e., a subframe to which the next SPS NPDSCH is allocated). That is, even if the SPS is activated for the UE, the UE may be configured to perform the SPS retransmission operation through available subframes within the SPS interval (i.e., the interval between the SPS NPDSCHs).

Figure 8:
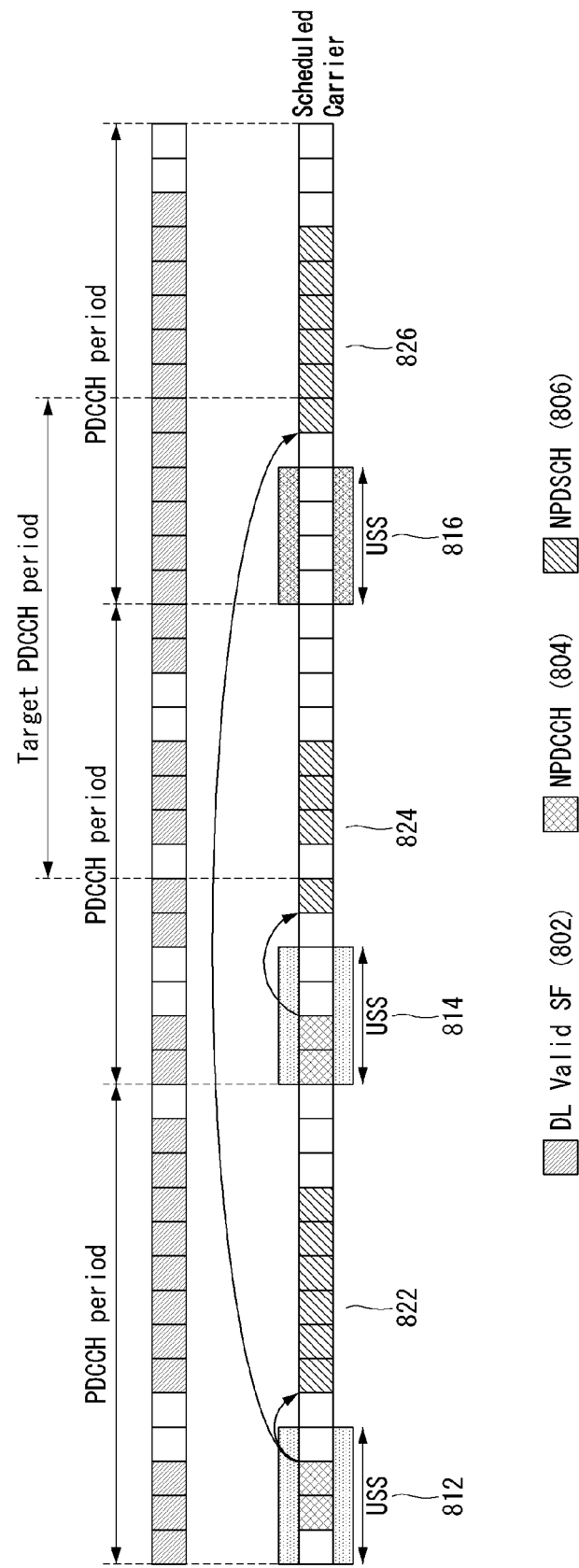
FIG. 8 illustrates another example of an SPS operation to which a method proposed in this specification may be applied.

As an example, the above-described SPS retransmission operation may be performed as illustrated in FIG. 8.

FIG. 8 illustrates another example of an SPS operation to which a method proposed in this specification may be applied. FIG. 8 is just for convenience of the description and does not limit the scope of the present disclosure.

Referring to FIG. 8, it is assumed that the UE receives configuration information for determining the USS and PDCCH thereof through the higher layer signaling, and the PDCCH period includes 14 subframes.

Like the case of FIG. 7 described above, the DL Valid SF 802 means a downlink valid subframe available by the corresponding NB-IoT UE, and NPNPCH 804 may man a region in which the NPDCCH for the NB-IoT UE is transmitted and NPDSCH 806 means a region in which the NPDSCH for the NB-IoT UE is transmitted.

In this case, the UE may be configured to monitor a first USS 812 and a second USS 814. The NPDCCH which belongs to the first USS 812 may means an NPDCCH for delivering the SPS activation DCI and the NPDCCH which belongs to the second USS 814 may mean an NPDCCH for delivering a DCI for SPS retransmission or a DCI for new transmission. Even in this case, the UE may be configured not to monitor a third USS 816 as described in FIG. 7 in order to maintain the UE complexity.

In other words, after a single HARQ UE is activated by the SPS, the UE may be configured not to monitor the USS region existing for an interval as long as a single PDCCH period determined by the USS of the UE from the transmission start subframe of the NPDSCH scheduled to the SPS. That is, when an interval between the USS (i.e., the first USS 812) which the UE monitors to receive the SPS activation DCI and the USS (i.e., the third USS 816) which the UE is configured not to monitor satisfies a predetermined condition, the UE may be configured to monitor a specific USS (e.g., the second USS 814) existing at the interval.

Here, the interval (i.e., the interval of a single PDCCH period from the transmission start subframe of the NPDSCH scheduled by the SPS) may be referred to as a target PDCCH period.

In this case, the search space (e.g., the third USS 816) which the UE is configured not to monitor may be determined (or configured) by using the configured PDCCH period, the configured SPS interval, and/or the configured target PDCCH period.

Specifically, the UE may receive the SPS activation DCI through monitoring the first USS 812 and receive NPDSCHs (i.e., SPS NPDSCHs 822 and 826) allocated according to the activated SPS. In this case, additionally, the UE may receive a general (i.e., not allocated by the SPS) NPDSCH (i.e., NPDSCH 824) through monitoring of the second USS 814.

For example, even though the SPS is activated for the UE, when the UE receives the NPDCCH for delivering the DCI for SPS retransmission through the second USS 814, the UE may be configured to receive the NPDSCH retransmitted in the resource region allocated according to the DCI.

The above-described method may be applied to the NPDSCH existing after the NPDSCH scheduled as the first SPS and may also be applied to the case where the NPDSCH is replaced with the NPUSCH (that is, uplink rather than downlink).

In this case, the SPS retransmission may be configured through another method depending on the methods (method 1 to method 3) for delivering the above-mentioned SPS release information.

For example, considering method 1 described above (i.e., a method in which the NDI field is set to 1 and the SPS release information is delivered through the SPS activation/release field), in case of SPS retransmission, the NDI field may be set to a value (i.e., NDI field 0) opposite to the value used for the activation or release of the SPS and the SPS activation release field may be set to a value (e.g., 0) indicating the activation. The reverse case is also possible.

In this case, the DCI scheduling the NPDSCH for SPS retransmission may be configured to use the SPS-C-RNTI.

In contrast, considering Method 2 or Method 3 described above, in the case of the SPS retransmission, the NDI field may be configured to be the same as in the case of SPS activation, and the SPS activation/release field may be configured to a value (e.g., 1) other than the value indicating the activation.

Even in this case, the DCI scheduling the NPDSCH for the SPS retransmission may be configured to use the SPS-C-RNTI.

Unlike this, after the above-mentioned SPS is activated, another NPDCCH may be configured not to be transmitted to the search space (i.e., USS) of the UE in the unallocated downlink valid subframe. That is, when the SPS is activated, the eNB may be configured not to transmit another downlink scheduling information in the unallocated downlink valid subframe for the SPS. In this case, the UE in which the SPS is activated may be configured not to need to continuously monitor the USS region configured through the higher layer signaling.

The method may be configured to allow the SPS-activated UE to sleep between downlink valid subframes in which the NPDSCHs allocated for the SPS are transmitted. Therefore, the UE needs to wake up to receive only the NPDSCH allocated for the SPS, thereby reducing the battery consumption.

Since the dynamic scheduling for retransmission may not be performed in the corresponding method, the corresponding method may be configured to be used for transmitting a channel (e.g., Single Cell-Multicast Control Channel (SC-MCCH), Single Cell-Multicast Traffic Channel (SC-MTCH), etc.) not requiring the retransmission.

In the above-described SPS operation, a method for delivering scheduling information (e.g., MCS, TBS, resource allocation information, etc.) for NPDSCH and/or NPUSCH using the DCI for the SPS activation (or SPS retransmission) is considered.

On the contrary, in the embodiment proposed in this specification, a method for delivering the MCS, the TBS, and/or resource allocation information included in the existing DCI UE-specifically through the higher layer signaling (e.g., SPS configuration information) may also be considered. In this case, the existing DCI may be replaced with a compact DCI including on/off information for the activation or release of the SPS, an NDI field indicating whether the retransmission is performed, and the like.

Here, the compact DCI refers to a DCI configured to a smaller size than the existing DCI. When the Compact DCI is used, since the length of the DCI is shortened, the overhead (i.e., decoding overhead) of the NPDCCH and a waking time of the UE are reduced, thereby reducing the battery consumption of the UE. In other words, since an interval (e.g., an interval in which the BD is repeatedly performed) in which the UE decodes may be shortened, the battery consumption of the UE may be reduced.

Figure 9:
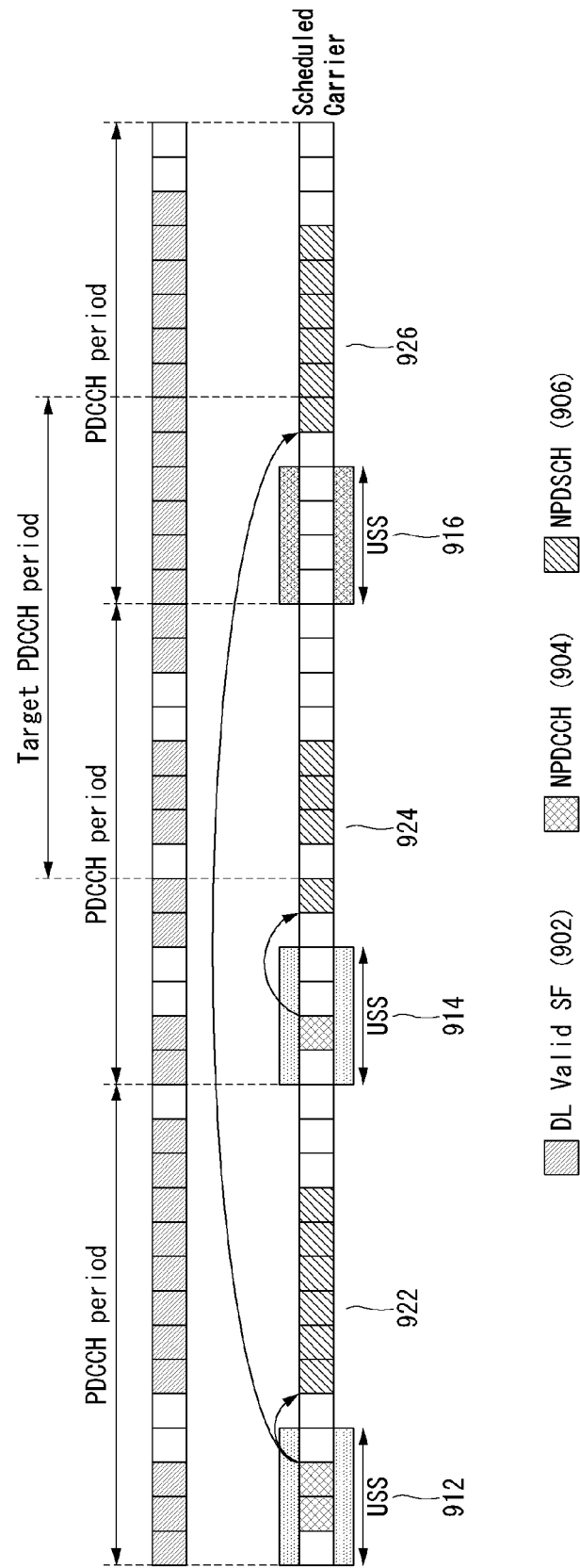
FIG. 9 illustrates yet another example of an SPS operation to which a method proposed in this specification may be applied.

FIG. 9 illustrates yet another example of an SPS operation to which a method proposed in this specification may be applied. FIG. 9 is just for convenience of the description and does not limit the scope of the present disclosure.

Referring to FIG. 9, it is assumed that as the DCI for the SPS activation, the DCI having the same size as the existing DCI is used and as the DCI for the SPS retransmission, the compact DCI is used. Further, FIG. 9 is similar to the case of FIG. 8 except that the compact DCI is used, so a duplicated description is omitted.

As an example, the size (or length) of the compact DCI may be configured to half the size of the existing DCI. That is, as illustrated in FIG. 9, the compact DCI delivered in the second USS 914 may be configured to half the size of the DCI delivered in the first USS 912.

In this case, as described above, the power of the UE consumed in the DCI reception in the second USS 914 is smaller than the power consumed in the DCI reception in the first USS 912 and as the compact DCI is used, the UE may receive the DCI faster.

Hereinafter, the method of using the Compact DCI in relation to the operation of the SPS will be described in detail.

When the Compact DCI is used, the number of BDs of the UE may increase due to the size difference from the existing DCI.

Accordingly, a method for newly defining the search space in which the compact DCI for the SPS may be transmitted and allocating the search space so as not to overlap with the existing search space may be considered. In this case, the UE may be configured to expect the eNB to allocate the search space so as not to overlap with the existing search space.

Alternatively, a method for newly defining the search space in which the compact DCI for the SPS may be transmitted and configuring a priority between the existing search space and the search space for the SPS may also be considered. For example, if the existing search space and the search space for the SPS are partially overlapped in the time domain, the UE may be configured to select one of the two search spaces according to the priority and monitor the DCI (i.e., the existing DCI or SPS).

In addition, the SPS-activated NB-IoT UE expects not to transmit the existing DCI to the existing search space after the SPS activation and may be configured to expect that only the compact DCI that may deliver the SPS retransmission or release information is transmitted. That is, after the SPS is activated, the UE may be configured to receive only the compact DCI. In this case, the SPS activated DCI may be configured to have the same size (or length) as the existing DCI (e.g., DCI formats N0, N1, and N2) and deliver the MCS, the TB, the resource allocation information, etc.

Even in this case, even if the compact DCI is used, the number of BDs of the UE does not increase.

Alternatively, the NB-IoT UE in which the SPS is configured may expect that the existing DCI is not transmitted to the existing search space after the SPS configuration time. In this case, the UE may be configured to expect that only the compact DCI capable of delivering the activation, release, or retransmission information for the SPS is transmitted in the corresponding search space.

Even in this case, even if the compact DCI is used, the number of BDs of the UE does not increase.

In addition to the compact DCI described above, methods of using a predetermined (or promised) specific signal (e.g., wake up signal) for the SPS retransmission or dynamic scheduling (e.g., dynamic grant) after the SPS is activated may also be considered.

In this case, in order to prevent power consumption of the UE, it may be assumed that the UE is configured not to monitor the search space (e.g., USS or CSS) existing at a predetermined time (e.g., a subframe within a target PDCCH period) during a predetermined period after the SPS is activated as a precondition.

As a first method, a method for delivering to the UE whether to monitor the search space existing at a predetermined time after the SPS is activated using a predetermined signal may be considered.

Specifically, the SPS-activated UE may be configured not to monitor the search space according to the above-described precondition, but the eNB may need to transmit a downlink or uplink grant (DL/UL grant) in the corresponding search space or transmit control information for scheduling the SPS retransmission. Here, the SPS retransmission may be configured to be performed when the eNB receives a NACK for the SPS transmission from the UE.

When the UE detects the predetermined specific signal at a time earlier than the time when the corresponding search space exists (that is, when the UE recognizes that the specific signal is transmitted), the UE may be configured to monitor the corresponding search space. At this time, the UE may be configured to know in advance that the specific signal may be transmitted at the time earlier than the time when the corresponding search space exists.

In this case, the UE may determine whether to retransmit or dynamically schedule the SPS by monitoring the corresponding search space. When using the method, since the UE only needs to determine whether a predetermined specific signal is transmitted instead of monitoring the search space after the SPS is activated, there is an advantage of reducing the power consumption of the UE.

As a second method, a method for configuring the UE to determine whether the predetermined specific signal is transmitted instead of the search space in place of the search space existing at the predetermined time after the SPS is activated and identify that the information on the SPS retransmission, the dynamic scheduling, or the SPS deactivation is transmitted may be considered.

Specifically, the SPS-activated UE may be configured not to monitor the search space existing at the predetermined time according to the above-described precondition, but the eNB may need to transmit a downlink or uplink grant (DL/UL grant) in the corresponding search space or transmit control information for scheduling the SPS retransmission (or SPS deactivation).

If the UE detects the predetermined specific signal at the time when the corresponding search space exists, the UE may be configured to distinguish whether the NPDSCH transmitted later according to the detected specific signal is for SPS retransmission, for the downlink grant (or uplink grant), or for the SPS deactivation.

As an example, the UE may be configured to distinguish the use of the NPDSCH by using a scrambling sequence, a cyclic shift, etc., applied to the specific signal. In this case, cross correlation performance needs to be good in order to distinguish different information.

At this time, the UE may be configured to know in advance that the specific signal may be transmitted at the time when the corresponding search space exists.

In addition, when it is determined that the SPS retransmission is performed by the predetermined specific signal, the UE may receive the NPDSCH again by using the scheduling information acquired through the previous SPS activation DCI (in the case of downlink SPS) or transmit the NPUSCH (in the case of uplink SPS). Alternatively, the UE may receive the NPDSCH or transmit the NPUSCH using predetermined scheduling information. Here, the predetermined scheduling information may be defined on the system (or on a standard) or may mean scheduling information configured through the higher layer signaling or the like.

In particular, when it is determined that a new NPDSCH (e.g., the downlink grant) is transmitted by a predetermined signal, in case of the downlink SPS activation, the scheduling information acquired through the previous SPS activation DCI may be configured to be reused for the corresponding scheduling information. On the other hand, in the case of the uplink SPS activation, the scheduling information may be configured to adopt the scheduling information of the basic configuration transmitted through the basic configuration defined in the system (or the specification) or the higher layer signaling.

Alternatively, in contrast, when it is determined that a new NPUSCH (e.g., the uplink grant) is transmitted by a predetermined signal, in case of the uplink SPS activation, the scheduling information acquired through the previous SPS activation DCI may be configured to be reused for the corresponding scheduling information. On the other hand, in the case of the downlink SPS activation, the scheduling information may be configured to adopt the scheduling information of the basic configuration transmitted through the basic configuration defined in the system (or the specification) or the higher layer signaling.

In addition, if it is determined that the SPS deactivation is determined by a predetermined specific signal, the UE may be configured not to receive (or transmit) data in the SPS NPDSCH (or SPS NPUSCH) region configured thereafter.

In the above-described method, reusing the scheduling information may mean using the same scheduling information as the previous SPS activation DCI or using scheduling information configured with a smaller value than the field value obtained in the previous SPS activation DCI. For example, if the MCS field value is 5 in the previous SPS activation DCI, the MCS field value may be set to 3 in the scheduling information to be reused. At this time, the difference value to be applied to each field may be defined on the system or may be configured through the higher layer signaling.

As compared with the first method, in a second method, since the UE only needs to determine whether to transmit a specific signal, there is a big gain in terms of reducing the power consumption of the UE.

The above-described method of using a specific signal may also be applied to other situations in which the NPDCCH is generally monitored and operated. In other words, instead of monitoring the NPDCCH, the UE may be configured to operate by determining whether the specific signal is transmitted. For example, instead of monitoring the NPDSCH, the UE may determine whether the wake up signal is transmitted at the time to which the specific search space belongs and determine whether to transmit paging.

Second Embodiment—SPS Operating Method for NB-IoT UE Supporting Multiple HARQs

Next, when the SPS is introduced in the NB-IoT system, a method of maintaining the complexity of the UE simultaneously supporting the multiple HARQs will be described.

Hereinafter, for convenience of description, the present disclosure will be described in the case of an NB-IoT UE supporting two HARQ processes, but may be equally applicable to an NB-IoT UE supporting three or more HARQ processes.

The higher layer signaling procedure for the SPS operation of the UE supporting the two HARQ processes and the method of configuring (or transmitting) the SPS activation DCI are the same as the case of the SPS operation of the UE supporting the single HARQ process described above.

The UE may initially receive information indicating that the SPS interval is N DL valid subframes (where N is a positive integer) and the SPS-C-RNTI value as a specific RNTI value through the higher layer signaling. In this case, the UE may monitor the USS region thereof and receive the SPS activation DCI transmitted through the NPDCCH.

In this case, the UE supporting the two HARQ processes may be configured not to be instructed whether monitor the specific search space among the search spaces configured for the UE from the eNB or select whether to monitor the specific search space. A detailed example thereof is illustrated in FIG. 10.

Figure 10:
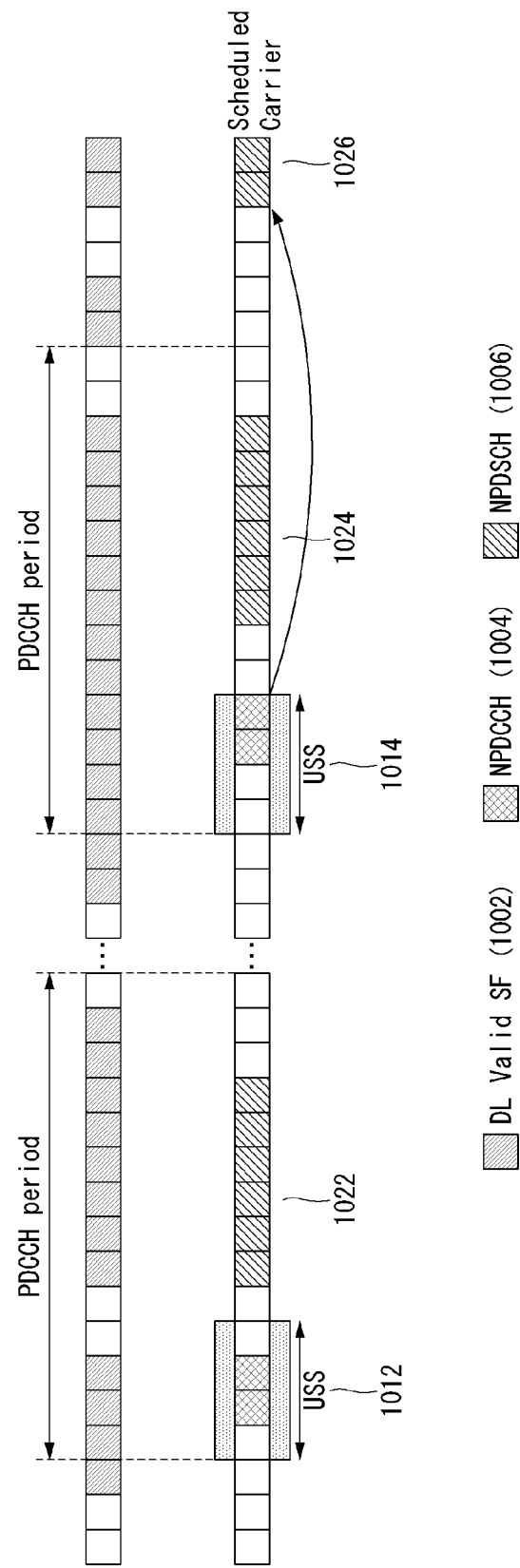
FIG. 10 illustrates still yet another example of an SPS operation to which a method proposed in this specification may be applied.

FIG. 10 illustrates still yet another example of an SPS operation to which a method proposed in this specification may be applied. FIG. 10 is just for convenience of the description and does not limit the scope of the present disclosure.

Referring to FIG. 10, it is assumed that the UE receives configuration information for determining the USS and PDCCH thereof through the higher layer signaling, and the PDCCH period includes 14 subframes. In addition, it is assumed that the UE may support two HARQ processes.

A downlink valid subframe (DL Valid SF) 1002, an NPDCCH 1004, and an NPDSCH 1006 have the same meanings as those described with reference to FIGS. 7 to 9, and thus redundant descriptions thereof are omitted.

The NPDCCH belonging to a first USS 1012 means the NPDCCH in which the SPS activation DCI is delivered. An NPDSCH 1022 appearing next to the first USS 1012 and an NPDSCH 1024 positioned spaced apart from the SPS interval (e.g., N downlink valid subframes) based on the starting subframe (i.e., a starting downlink valid subframe) of the corresponding NPDSCH may mean NPDSCH allocated according to the SPS configuration.

In this case, in order to satisfy the complexity of the UE corresponding to the two HARQs, the UE may be configured to monitor or not to monitor the USS (i.e., second USS 1014) corresponding to the remaining NPDSCH 1024 except the first allocated NPDSCH 1022 among the allocated NPDSCHs according to the SPS configuration.

For example, whether to monitor the second USS 1014 may be determined (or configured) through a capability (i.e., UE category) of the UE and/or the higher layer signaling of the eNB. Specifically, the eNB may deliver information indicating whether to monitor the second USS 1014 to the UE through the higher layer signaling. In this case, each UE may be configured to select whether to monitor the second USS 1014. That is, whether to monitor the second USS 1014 may be determined according to the instruction of the eNB and/or the selection of the UE.

In other words, the UE supporting the single HARQ process may be configured not to monitor the second USS 1014, but the UE supporting two HARQ processes may be configured to monitor the second USS 1014. Here, the UE supporting the single HARQ process may mean a UE having 1 HARQ complexity and the UE supporting two HARQ processes may mean a UE having 2 HARQ complexity.

In addition, the UE receiving information indicating to monitor the second USS 1014 through the higher layer signaling may be configured to monitor the second USS 1014 and the UE receiving information indicating not to monitor the second USS 1014 through the higher layer signaling may be configured not to monitor the second USS 1014.

Through the above-described method, the UE that does not monitor the second USS 1014 may obtain a battery consumption reduction effect and the UE that monitors the second USS 1014 may receive dynamic scheduling.

If the UE monitors the second USS 1014 and receives a new NPDCCH, the NPDSCH 1024 scheduled by the new NPDCCH needs to be configured not to overlap with the NPDSCH regions (NPDSCHs 1022 and 1024) allocated for the SPS operation by the eNB. In this case, the new NPDCCH may be a general NPDCCH or an NPDCCH for a new SPS operation.

In addition, the ACK/NACK resource of the NPDSCH 1026 scheduled by the new NPDCCH also needs to be configured by the eNB so as not to overlap with the ACK/NACK resource of the NPDSCH (NPDSCH 1022 and 1024) allocated through the SPS operation. Therefore, the eNB may distinguish which NPDSCH ACK/NACK information according to the corresponding ACK/NACK resources.

In addition, like the UE supporting the single HARQ process described above, even in the case of the UE supporting two HARQ processes, after the above-mentioned SPS is activated, another NPDCCH may be transmitted in the search space (i.e., USS) of the UE in an unallocated downlink valid subframe. As an example, the other NPDCCH may mean an NPDCCH for SPS retransmission, a new general NPDCCH, or the like.

That is, even if the SPS of the UE is activated, the UE may be configured to continuously monitor the USS region configured through the higher layer signaling. Here, it is assumed that NPDSCH or NPUSCH is not scheduled at a time corresponding to the USS region.

In this case, since the UE continuously monitors the USS region configured through the higher layer signaling, a new NPDSCH may be received through SPS retransmission before the next SPS allocation time (i.e., a subframe to which the next SPS NPDSCH is allocated).

That is, even if the SPS is activated for the UE, the UE may be configured to perform the SPS retransmission operation through available subframes within the SPS interval (i.e., the interval between the SPS NPDSCHs).

In this case, the SPS retransmission may be configured through another method depending on the methods (method 1 to method 3) for delivering the SPS release information described in the first embodiment.

For example, considering method 1 described above (i.e., a method in which the NDI field is set to 1 and the SPS release information is delivered through the SPS activation/release field), in case of SPS retransmission, the NDI field may be set to 0 and the SPS activation release field may be set to a value (e.g., 0) indicating the activation. In this case, the DCI scheduling the NPDSCH for SPS retransmission may be configured to use the SPS-C-RNTI.

In contrast, considering Method 2 or Method 3 described above, in the case of the SPS retransmission, the NDI field may be configured to be the same as in the case of SPS activation, and the SPS activation/release field may be configured to a value (e.g., 0 or 1) other than the value indicating the activation. Even in this case, the DCI scheduling the NPDSCH for the SPS retransmission may be configured to use the SPS-C-RNTI.

Further, even in the case of the UE supporting two HARQ processes, like the UE supporting the single HARQ process described above, the compact DCI and/or a predetermined specific signal (e.g., a wake-up signal) may be applied in relation to the SPS operation.

Figure 11:
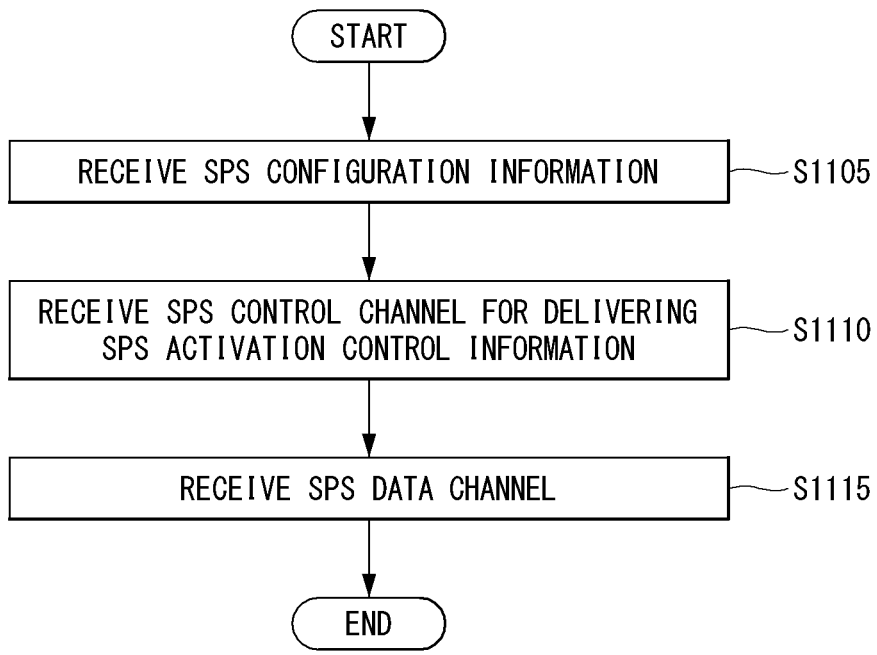
FIG. 11 illustrates an operational flowchart of a UE receiving data in a wireless communication system supporting an NB-IoT to which a method proposed in this specification may be applied.

FIG. 11 illustrates an operational flowchart of a UE receiving data in a wireless communication system supporting an NB-IoT to which a method proposed in this specification may be applied. FIG. 11 is just for convenience of the description and does not limit the scope of the present disclosure.

Referring to FIG. 11, it is assumed that the eNB and the UE transmit/receive data through the above-described SPS procedure. In this case, it is assumed that the UE supports the single HARQ process, that is, supports only one HARQ operation.

In step S1105, the UE may receive the SPS configuration information for semi-persistent scheduling (SPS) from the eNB. Here, the SPS configuration information may be delivered through the higher layer signaling.

Thereafter, in step S1110, the UE may receive, from the eNB, an SPS control channel (e.g., the above-described SPS NPDCCH) for delivering the control information (e.g., the above-described SPS activation DCI) indicating the activation of the SPS. Therefore, the SPS between the eNB and the UE may be activated.

Thereafter, in step S1115, the UE may receive, from the eNB, an SPS data channel (e.g., the above-described SPS NPDSCH) in specific subframes (e.g., downlink valid subframes to which the SPS is allocated) scheduled according to the SPS configuration information.

At this time, the search space (e.g., the second USS 714 of FIG. 7, the third USS 816 of FIG. 8, and the third USS 916 of FIG. 9) related to the remaining SPS data channels except for the first SPS data channel among the received SPS data channels is configured not to be monitored by the UE.

In this case, the unmonitored search space may be located within a specific period (e.g., target PDCCH period) configured based on at least one of a start subframe, SPS interval information, or a PDCCH period of each SPS data channel. As an example, the search space may correspond to the search space (e.g., USS) located within the PDCCH period to which each SPS data channel belongs.

In addition, the UE may receive a specific control channel (e.g., the NPDCCH for the SPS retransmission or a new NPDCCH) for delivering the control information indicating the retransmission of the SPS from the eNB and receive a specific data channel scheduled by the specific control channel. That is, the UE may perform a retransmission procedure for the above-described SPS procedure.

In this case, the resource region (e.g., USS for receiving the specific control channel) allocated to the specific control channel and the resource region allocated to the specific data channel may not overlap with the search space configured not to be monitored by the UE.

Device to which the Present Disclosure May be Applied

Figure 12:
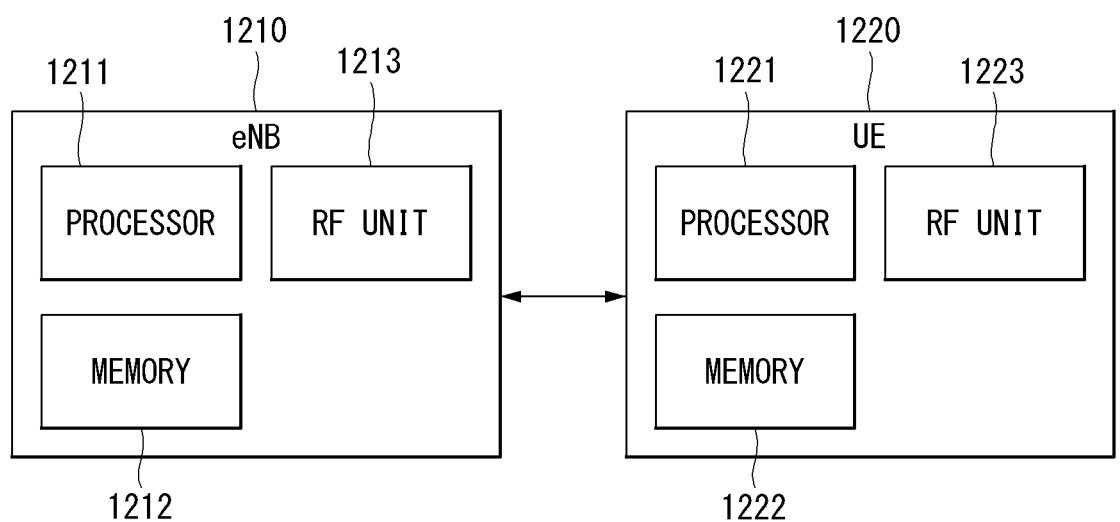
FIG. 12 illustrates a block diagram of a wireless communication device to which methods proposed by this specification may be applied.

FIG. 12 illustrates a block diagram of a wireless communication device to which methods proposed by the present specification may be applied.

Referring to FIG. 12, a wireless communication system comprises an eNB 1210 and a plurality of UEs 1220 located within the range of the eNB 1210.

The eNB 1210 comprises a processor 1211, memory 1212, and Radio Frequency (RF) unit 1213. The processor 1211 implements the functions, processes and/or methods described with reference to FIGS. 1 to 11. Layers of a wireless interface protocol may be implemented by the processor 1211. The memory 1212, being connected to the processor 1211, stores various kinds of information to operate the processor 1211. The RF unit 1213, being connected to the processor 1211, transmits and/or receives a radio signal.

The UE 1220 comprises a processor 1221, memory 1222, and RF unit 1223.

The processor 1221 implements the functions, processes and/or methods described with reference to FIGS. 1 to 11. Layers of a wireless interface protocol may be implemented by the processor 1221. The memory 1222, being connected to the processor 1221, stores various kinds of information to operate the processor 1221. The RF unit 1223, being connected to the processor 1221, transmits and/or receives a radio signal.

The memory 1212, 1222 may be installed inside or outside the processor 1211, 1221 and may be connected to the processor 1211, 1221 via various well-known means. Also, the eNB 1210 and/or the UE 1220 may be equipped with a single antenna or multiple antennas.

Figure 13:
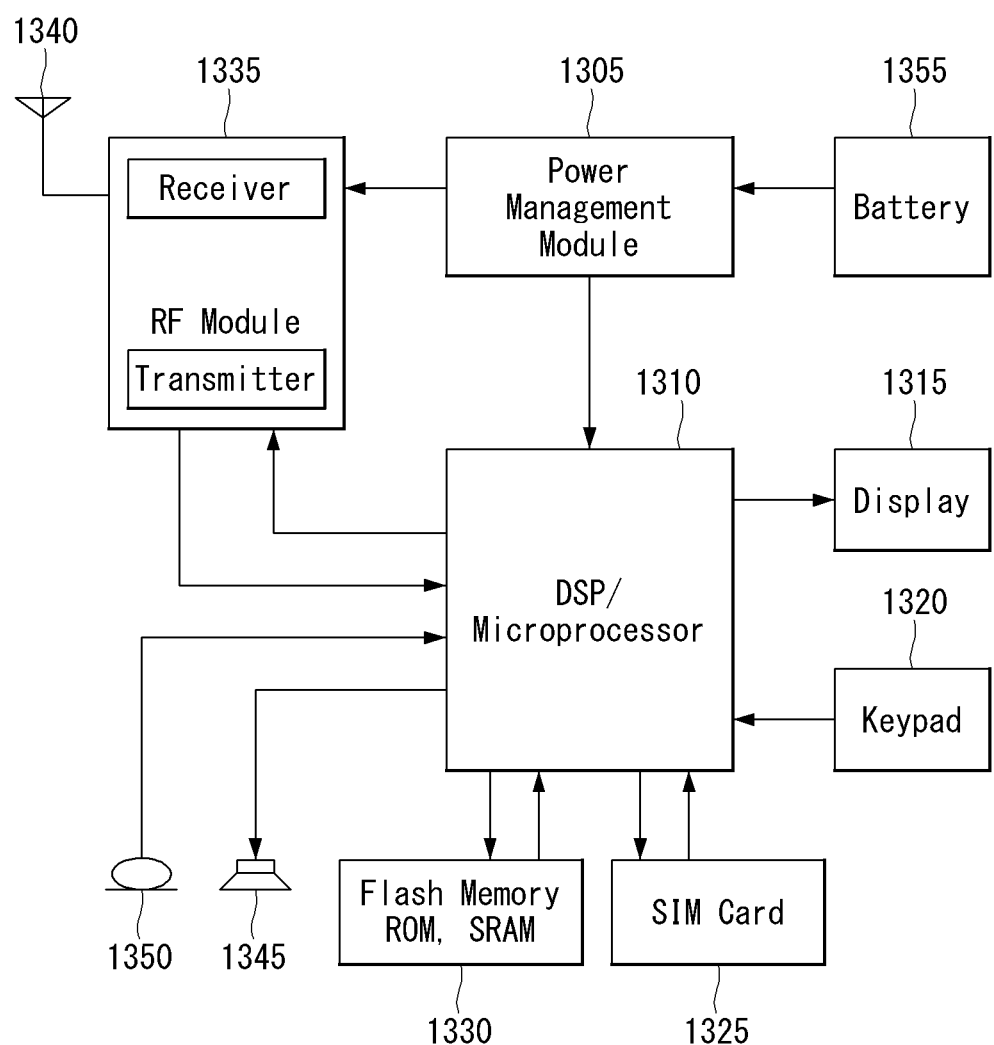
FIG. 13 illustrates a block diagram of a communication device according to an embodiment of the present disclosure.

FIG. 13 illustrates a block diagram of a communication device according to one embodiment of the present disclosure.

In particular, FIG. 13 illustrates the UE of FIG. 12 in more detail.

Referring to FIG. 13, a UE may comprise a processor (or digital signal processor (DSP)) 1310, RF module (or RF unit) 1335, power management module 1305, antenna 1340, battery 1355, display 1315, keypad 1320, memory 1330, Subscriber Identification Module (SIM) card 1325 (this component is optional), speaker 1345, and microphone 1350. The UE may also include a single antenna or multiple antennas.

The processor 1310 implements the functions, processes and/or methods described with reference to FIGS. 1 to 11. Layers of a wireless interface protocol may be implemented by the processor 1310.

The memory 1330, being connected to the processor 1310, stores various kinds of information to operate the processor 1310. The memory 1330 may be installed inside or outside the processor 1310 and may be connected to the processor 1310 via various well-known means.

The user enters command information such as a phone number by pushing (or touching) buttons of the keypad 1320 or voice activation using the microphone 1350. The processor 1310 receives such command information and processes the command information to perform an appropriate function such as calling the phone number. Operational data may be extracted from the SIM card 1325 or memory 1330. Also, the processor 1310 may display command information or operating information on the display 1315 for the user's attention and convenience.

The RF module 1335, being connected to the processor 1310, transmits and/or receives an RF signal. The processor 1310 delivers command information to the RF module 1335 to initiate communication, for example, to transmit a radio signal comprising voice communication data. The RF module 1335 comprises a receiver and a transmitter to receive and transmit a radio signal. The antenna 1340 performs a function of transmitting and receiving a radio signal. When receiving a radio signal, the RF module 1335 may deliver the signal to be processed by the processor 1310 and convert the signal into the baseband. The processed signal may be converted to audible signal output through the speaker 1345 or readable information.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present disclosure by coupling a part of the elements and/or technical features. The order of operations described in the embodiments of the present disclosure may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present disclosure may be implemented by various means, for example, hardware, firmware, software and the combination thereof. In the case of the hardware, an embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present disclosure may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present disclosure should be determined by reasonable interpretation of the attached claims, and all modification within the scope of equivalence should be included in the scope of the present disclosure.

INDUSTRIAL APPLICABILITY

This document discloses a method for transmitting and receiving data in a wireless communication system supporting NB-IoT with examples based on the 3GPP LTE/LTE-A system; however, the present disclosure may be applied to various other types of wireless communication systems in addition to the 3GPP LTE/LTE-A system.

The invention claimed is:

1. A method of transmitting and receiving, by a user equipment (UE), data in a wireless communication system supporting NarrowBand-Internet of Things (NB-IoT), the method comprising:
   receiving, from a base station, Semi-Persistent Scheduling (SPS) configuration information for SPS;
   receiving, from the base station, an SPS control channel for delivering control information representing activation of the SPS; and
   receiving, from the base station, SPS data channels in specific subframes scheduled according to the SPS configuration information,
   wherein search spaces related to the remaining SPS data channels other than a first SPS data channel among the received SPS data channels are configured not to be monitored by the UE.

2. The method of claim 1, wherein the search space is located within a specific period configured based on at least one of a start subframe, SPS interval information, or a PDCCH period of each SPS data channel.

3. The method of claim 2, wherein the search space corresponds to a search space located within a PDCCH period to which each SPS channel belongs.

4. The method of claim 3, wherein the search space is configured to be user equipment-specific.

5. The method of claim 1, wherein the control information representing the activation of the SPS includes an SPS indication field configured by 1 bit indicating the activation or deactivation of the SPS.

6. The method of claim 1, wherein the UE supports a single Hybrid Automatic Repeat and request (HARQ) process.

7. The method of claim 1, further comprising:
   receiving, from the base station, a specific control channel for carrying control information indicating retransmission of the SPS; and
   receiving a specific data channel scheduled by the specific control channel,
   wherein a resource region allocated to the specific control channel and a resource region allocated to the specific data channel do not overlap with the search space.

8. The method of claim 7, wherein a size of the control information representing the retransmission of the SPS is configured to be smaller than the size of the control information representing the activation of the SPS.

9. The method of claim 7, wherein a value of a New Data Indication (NDI) field included in the control information representing the retransmission of the SPS is configured opposite to the value of the NDI field included in the control information representing the activation of the SPS.

10. The method of claim 1, further comprising:
receiving, from the base station, a specific signal indicating whether to monitor the search space,
wherein the specific signal is transmitted when the SPS is activated.

11. A user equipment (UE) configured to receive data in a wireless communication system supporting NarrowBand-Internet of Things (NB-IoT), the UE comprising:
at least one transceiver; and
at least one processor functionally connected to the at least one transceiver,
wherein the at least one processor is configured to
receive, from a base station, Semi-Persistent Scheduling (SPS) configuration information for SPS,
receive, from the base station, an SPS control channel for delivering control information representing activation of the SPS, and
receive, from the base station, SPS data channels in specific subframes scheduled according to the SPS configuration information, and
wherein search spaces related to the remaining SPS data channels other than a first SPS data channel among the received SPS data channels are configured not to be monitored by the UE.

12. The UE of claim 11, wherein the search space is located within a specific period configured based on at least one of a start subframe, SPS interval information, or a PDCCH period of each SPS data channel.

13. The UE of claim 12, wherein the search space corresponds to a search space located within a PDCCH period to which each SPS channel belongs.

14. The UE of claim 13, wherein the search space is configured to be user equipment-specific.

15. The UE of claim 11, wherein the control information representing the activation of the SPS includes an SPS indication field configured by 1 bit indicating the activation or deactivation of the SPS.

16. The UE of claim 11, wherein the UE is configured to support a single Hybrid Automatic Repeat and request (HARQ) process.

17. The UE of claim 11, wherein the at least one processor is further configured to:
receive, from the base station, a specific control channel for carrying control information indicating retransmission of the SPS; and
receive a specific data channel scheduled by the specific control channel,
wherein a resource region allocated to the specific control channel and a resource region allocated to the specific data channel do not overlap with the search space.

18. The UE of claim 17, wherein a size of the control information representing the retransmission of the SPS is configured to be smaller than the size of the control information representing the activation of the SPS.

19. The UE of claim 17, wherein a value of a New Data Indication (NDI) field included in the control information representing the retransmission of the SPS is configured opposite to the value of the NDI field included in the control information representing the activation of the SPS.

20. At least one computer-readable storage device storing instructions that, based on being executed by at least one processor, control a user equipment (UE) to perform operations in a wireless communication system supporting NarrowBand-Internet of Things (NB-IoT), the operations comprising:
receiving, from a base station, Semi-Persistent Scheduling (SPS) configuration information for SPS;
receiving, from the base station, an SPS control channel for delivering control information representing activation of the SPS; and
receiving, from the base station, SPS data channels in specific subframes scheduled according to the SPS configuration information,
wherein search spaces related to the remaining SPS data channels other than a first SPS data channel among the received SPS data channels are configured not to be monitored by the UE.

* * * * *